US012498236B2

(12) United States Patent
Quint et al.

(10) Patent No.: US 12,498,236 B2
(45) Date of Patent: Dec. 16, 2025

(54) MAP POSITIONING VIA INDICATION OF TURN INTENTION

(71) Applicant: Rivian IP Holdings, LLC, Plymouth, MI (US)

(72) Inventors: Jason Meyer Quint, Ann Arbor, MI (US); Kok Wei Koh, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 39 days.

(21) Appl. No.: 17/385,984

(22) Filed: Jul. 27, 2021

(65) Prior Publication Data

US 2023/0037006 A1 Feb. 2, 2023

(51) Int. Cl.

| | |
|---|---|
| ***G01C 21/36*** | (2006.01) |
| ***B60W 40/09*** | (2012.01) |
| ***G01C 21/00*** | (2006.01) |

(52) U.S. Cl.

CPC ......... *G01C 21/3617* (2013.01); *B60W 40/09* (2013.01); *G01C 21/3635* (2013.01); *G01C 21/3837* (2020.08); *B60W 2540/227* (2020.02); *B60W 2552/53* (2020.02); *B60W 2554/4045* (2020.02)

(58) Field of Classification Search

CPC ............ G01C 21/3617; G01C 21/3837; G01C 21/3635; B60W 40/09; B60W 2540/227; B60W 2552/53; B60W 2554/4045

USPC .......................................................... 701/533

See application file for complete search history.

(56) References Cited

U.S. PATENT DOCUMENTS

| | | | | |
|---|---|---|---|---|
| 9,322,665 | B2 * | 4/2016 | Blumenberg | G01C 21/367 |
| 2012/0253580 | A1 * | 10/2012 | Al-Mahnna | G01C 21/3697 701/23 |
| 2012/0296522 | A1 * | 11/2012 | Otuka | B60W 30/12 701/41 |
| 2013/0261889 | A1 * | 10/2013 | Sekine | B60W 50/085 701/93 |
| 2018/0348000 | A1 * | 12/2018 | Cai | G08G 1/0112 |
| 2019/0113351 | A1 * | 4/2019 | Antony | B60W 30/18145 |

(Continued)

OTHER PUBLICATIONS

Frossard, D., Kee, E., and Urtasun, R., "DeepSignals: Predicting Intent of Drivers Through Visual Signals", <url>https://arxiv.org/abs/1905.01333</url>, 2019. (Year: 2019).*

*Primary Examiner* — Helal A Algahaim
*Assistant Examiner* — Karen Lynelle Furgason
(74) *Attorney, Agent, or Firm* — Patterson + Sheridan, LLP

(57) ABSTRACT

Disclosed embodiments include computer-implemented methods, systems, and vehicles for detecting an intention to make a turn and automatically changing a view presented by the navigation system to increase a viewable portion of the turn. In an illustrative embodiment, a system includes a computing device that includes a processor and computer-readable media configured to store computer-executable instructions configured to cause the processor to: detect that a navigation system of a vehicle is operating without a predetermined destination; identify an intention of an operator to turn the vehicle; and, responsive to identifying the intention to turn the vehicle, automatically adjusting a view presented by a display of the navigation system to increase a viewable portion of the turn.

15 Claims, 21 Drawing Sheets

(56) References Cited

U.S. PATENT DOCUMENTS

| | | | | |
|---|---|---|---|---|
| 2019/0147741 | A1* | 5/2019 | Rosas-Maxemin | G08G 1/096827 701/425 |
| 2019/0255989 | A1* | 8/2019 | Rowell | G06V 20/597 |
| 2020/0189581 | A1* | 6/2020 | Yang | B60W 40/04 |
| 2020/0242938 | A1* | 7/2020 | Suzuki | G08G 1/052 |
| 2021/0156705 | A1* | 5/2021 | Pietryka | B60K 35/00 |
| 2021/0301920 | A1* | 9/2021 | Noguchi | F16H 59/48 |
| 2022/0013007 | A1* | 1/2022 | Balasubramanian | H04W 4/40 |

* cited by examiner

MAP POSITIONING VIA INDICATION OF TURN INTENTION

INTRODUCTION

Navigational systems can provide helpful information to guide an operator to a destination and to provide information about traffic congestion, roadwork, and other conditions that may affect travel. For example, many navigational systems allow a user to manually change an image of a map represented on a display by using a finger to tap keys to zoom in or zoom out on the image, using two or more fingers to expand or contract the image, or using one or more fingers to "drag" the image to recenter the map. However, an operator taking his or her hands off the steering wheel and/or taking his or her eyes off the road to manipulate the navigation system to present a desired view can possibly help contribute to presenting a potential driving hazard.

SUMMARY

Disclosed embodiments include computer-implemented methods, systems, and vehicles for detecting an intention of an operator of a vehicle to turn the vehicle and automatically changing a view presented by the navigation system to increase a viewable portion of the turn.

In an illustrative embodiment, a system includes a computing device that includes a processor and computer-readable media configured to store computer-executable instructions configured to cause the processor to: detect that a navigation system of a vehicle is operating without a predetermined destination; identify an intention of an operator to turn the vehicle; and, responsive to identifying the intention to turn the vehicle, automatically adjusting a view presented by a display of the navigation system to increase a viewable portion of the turn.

In another illustrative embodiment, a vehicle includes a cabin, a drive system, and a computing device that includes a processor and computer-readable media configured to store computer-executable instructions configured to cause the processor to: detect that a navigation system of a vehicle is operating without a predetermined destination; identify an intention of an operator to turn the vehicle; and, responsive to identifying the intention to turn the vehicle, automatically adjusting a view presented by a display of the navigation system to increase a viewable portion of the turn.

In another illustrative embodiment, a method includes: detecting that a navigation system of a vehicle is operating without a predetermined destination; identifying an intention of an operator to turn the vehicle; and responsive to identifying the intention to turn the vehicle, automatically adjusting a view presented by a display of the navigation system to increase a viewable portion of the turn.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIG. 1 is a block diagram of an illustrative system and an illustrative screen display for a navigation system configured to detect an intention to perform a turn and automatically increase a viewable portion of the turn;

FIGS. 2, 3A, and 3B are screen displays generated by the navigation system of FIG. 1;

DETAILED DESCRIPTION

The following description explains, by way of illustration only and not of limitation, various embodiments.

By way of a non-limiting introduction and overview, embodiments include computer-implemented methods and systems (which may be incorporated in a vehicle) for detecting an intention of an operator of a vehicle to turn the vehicle and automatically changing a view presented by the navigation system to increase a viewable portion of the turn. In an illustrative embodiment, a system includes a computing device that includes a processor and computer-readable media configured to store computer-executable instructions configured to cause the processor to: detect that a navigation system of a vehicle is operating without a predetermined destination; identify an intention of an operator to turn the vehicle; and, responsive to identifying the intention to turn the vehicle, automatically adjusting a view presented by a display of the navigation system to increase a viewable portion of the turn.

As a result, various embodiments can help an operator to obtain a better view of the area around the turn before the turn is completed without having to take a hand off the steering wheel or look away from the road. Now that a general overview has been given, details of various embodiments will be explained by way of non-limiting examples given by way of illustration only and not of limitation.

Figure 1:
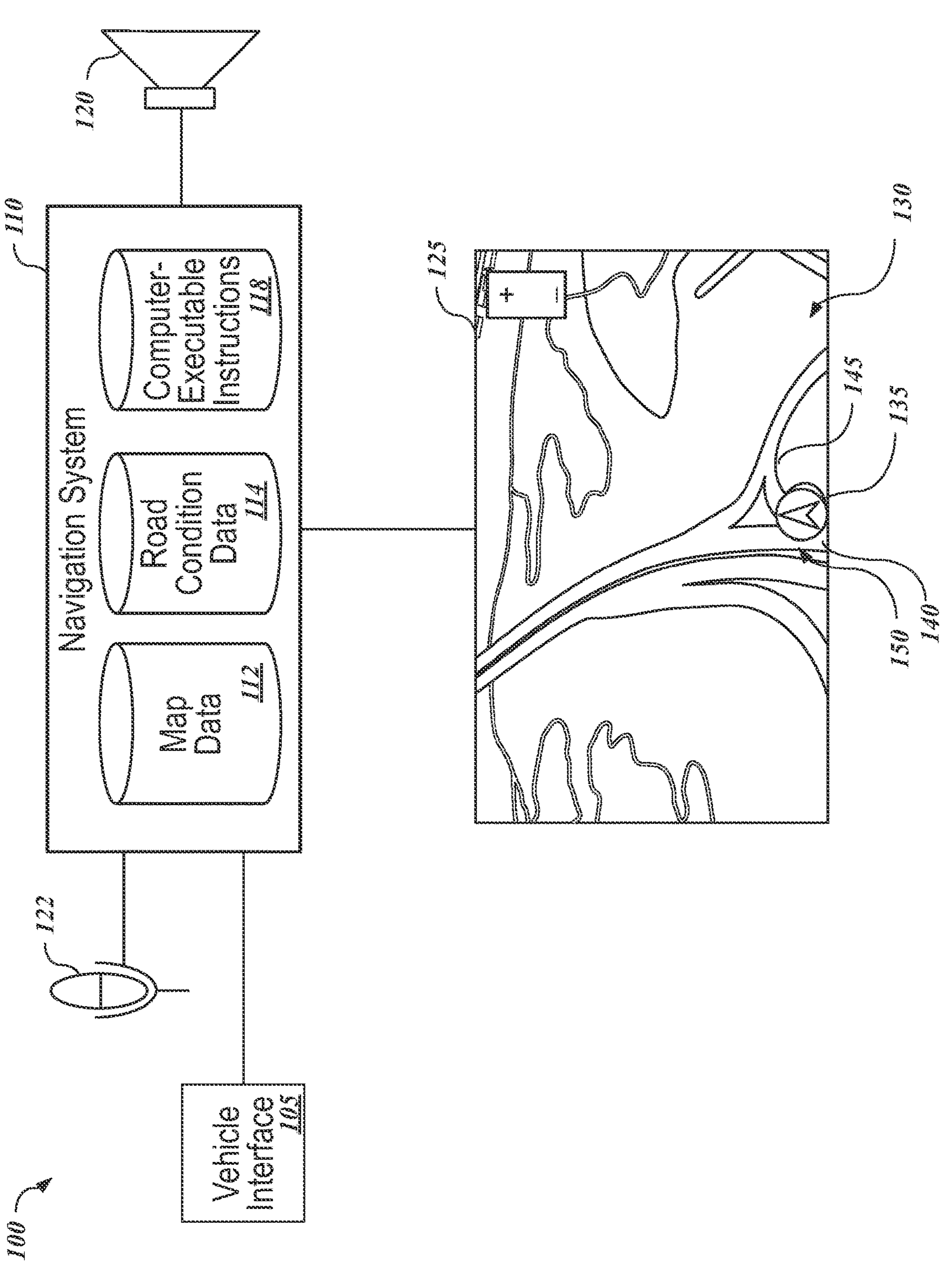

Referring to FIG. 1, an illustrative system 100 includes a navigation system 110 configured to automatically adjust a viewable portion of a turn as described herein. The navigation system 110 may include a computing device with a processor, memory, storage, and other devices, as further described below with reference to FIG. 12. The memory and/or storage of the navigation system 110 maintains map data 112, road condition data 114, and computer-executable instructions 118 to cause the navigation system 110 to perform functions herein described. The map data 112 includes information about roadways that may be used to determine the position of a vehicle, to identify routes to locations, and track progress on the routes. In various embodiments, the road condition data 114 includes information about road closures, road construction, traffic congestion, weather-related road conditions, and other conditions that may affect travel. In various embodiments, the road condition data 114 may be combined with the map data 112 or maintained separately. As further described below, the navigation system 110 may include a computing device incorporated in a vehicle or a standalone computing device such as a portable computer, a tablet computer, a smartphone, a wearable device, or another computing device that is transportable aboard a vehicle (not shown in FIG. 1).

In various embodiments, the navigation system 110 includes or is in communication with a display 125. In various embodiments, the display 125 may be an interactive touchscreen device capable of providing output from and receiving input to the navigation system 110. In various embodiments, the display 125 may be a noninteractive display that receives input from a keyboard, pointing device, or other input devices (not shown in FIG. 1). In various embodiments, the navigation system 110 also may include an audio input interface 122, such as a microphone, to receive verbal input. The navigation system 110 also may include an audio output interface 120, such as a speaker, to provide audible output.

In various embodiments, the navigation system 110 is communicatively coupled with a vehicle interface 105 of a vehicle (not shown in FIG. 1) to enable the navigation system 110 to receive information from vehicle sensors and systems as further described below. The navigation system 110 may be communicatively coupled with the vehicle interface 105 by wired and/or wireless connections. When the navigation system 110 is integrated with the vehicle, the navigation system 110 may be directly coupled to various vehicle systems.

In various embodiments, the display 125 presents a map 130 that depicts roadways and a position indicator 135 that shows the position of the vehicle. In the example of FIG. 1, the position indicator 135 shows that the vehicle is at a position 150 traveling on a current route 140 that includes a curved ramp that will result in the vehicle making a right turn 145. As the vehicle progresses on its current course, the position indicator 135 will show the vehicle moving into the turn 145, as described further below.

It will be appreciated that, when an operator of a vehicle directs a vehicle into a turn, the operator may not be able to see far enough along or around the turn to know whether the turn is tortuous or affected by construction work or traffic. Also, particularly in city driving where an operator cannot see around buildings into the turn, the operator may not be certain whether the turn will lead to a route that will lead to the desired destination.

For example, as in the example of FIGS. 1, although it does not appear on the map 130, the turn 145 is a “hairpin” turn in which the vehicle will turn more than one-hundred-eighty degrees—a fact which may be useful for the operator to know. On the other hand, there could be roadwork or traffic ahead around the turn 145, which would also be useful for the operator to know. Similarly, the turn 145 may not lead the operator where the operator wants to go. However, in order to safely operate the vehicle, the operator may not be able to turn and look around the turn 145 and may not want to take a hand off the steering wheel or look away from the current route ahead to manually change the image of the map 130 on the display 125 to see what lies ahead.

Figure 2:
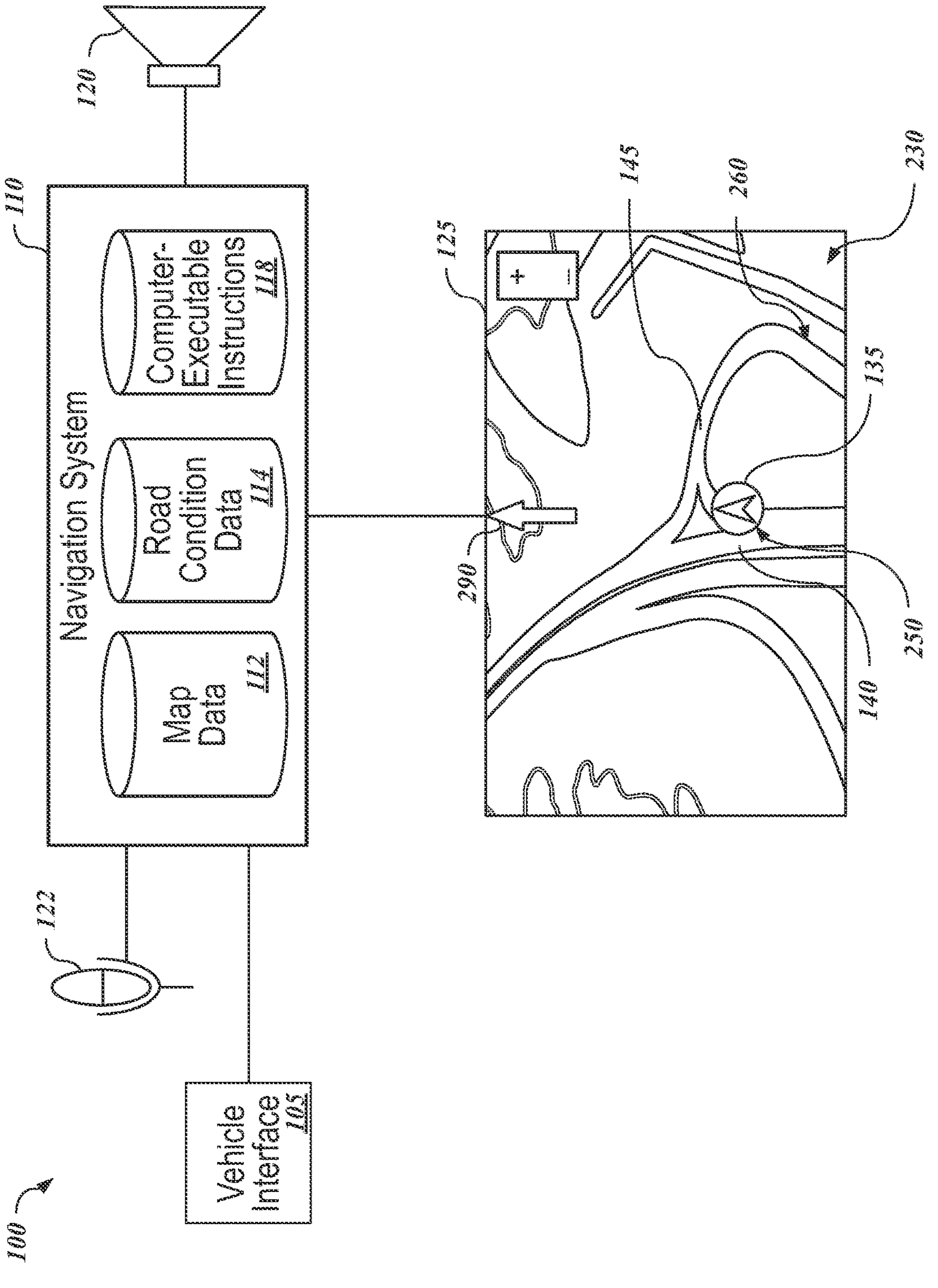

Referring additionally to FIGS. 2 and 3, as the vehicle moves to a next position 250 into the turn 145, the navigation system 110 identifies an intention to turn the vehicle and automatically adjusts a viewable portion of the turn 145. It will be appreciated that, if the navigation system 110 is currently in use to direct the operator to a particular destination, the navigation system 110 will be apprised of when turns will be made if the operator follows the route indicated by the navigation system 110. However, in various embodiments, when the navigation system 110 detects that it is not currently in use to guide the operator to a destination, the navigation system 110 may rely on accelerometers, visual sensors, positioning circuitry, or other the sensors to identify that the vehicle is making the turn 145.

Referring additionally to FIG. 2, in various embodiments the navigation system 110 adjusts a viewable portion of the turn 145 by generating a map 230 that recenters, pans, or shifts a view to show an increased viewable portion 260 of the turn 145. As previously described, the turn 145 is a hairpin turn through more than one-hundred-eighty degrees with the turn 145 actually extending behind a current attitude of the vehicle as shown by the position indicator 135. As previously described, the hairpin nature of the turn 145 was not viewable in the map 130 (FIG. 1). However, in various embodiments, as the vehicle enters the turn 145, the view is panned or shifted (as represented by arrow 290) to include the increased viewable portion 260 of the turn 145 in the map 130.

Figure 3A:
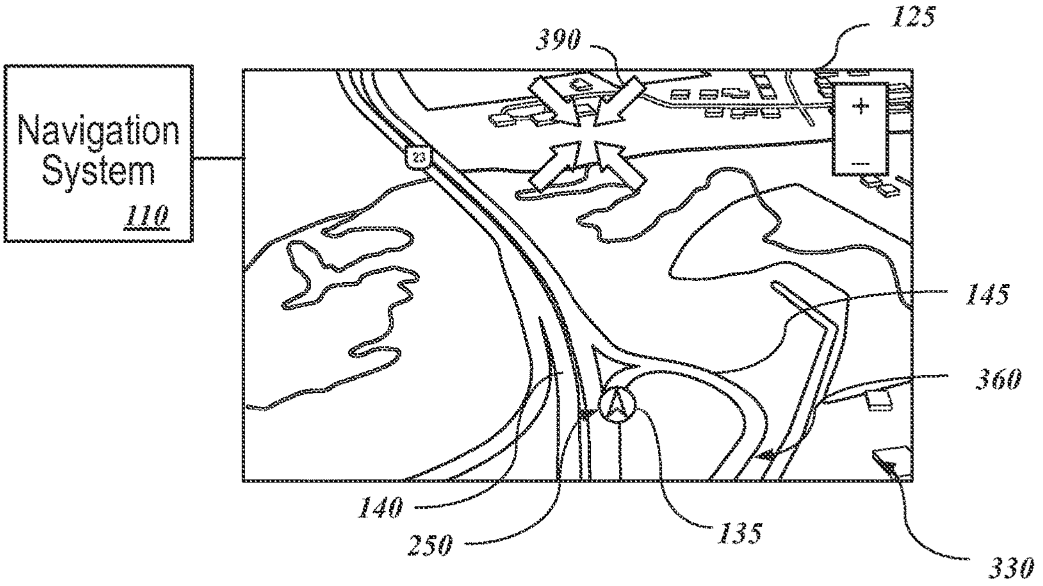
Figure 3B:
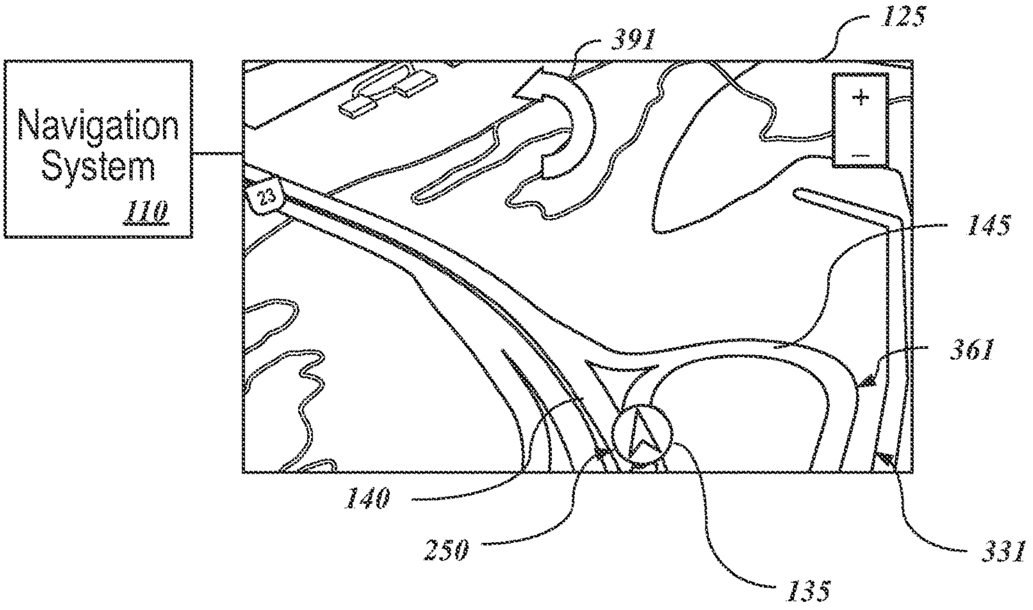

In various embodiments the navigation system 110 may adjust the viewable portion of the map in other ways. For example, referring additionally to FIG. 3A, the navigation system 110 adjusts a viewable portion of the turn 145 by generating a map 330 that adjusts a scale of the view to show an increased viewable portion 360 of the turn 145. As previously described, the hairpin nature of the turn 145 was not viewable in the map 130 (FIG. 1). However, in various embodiments, as the vehicle enters the turn 145, the scale of the view is decreased or collapsed (as represented by arrows 390) so that the map 330 includes a wider view of the turn 145 and, thus, includes the increased viewable portion 360 of the turn 145 in the map 330. Referring additionally to FIG. 3B, the navigation system 110 may generate a rotated map 331 that shows an increased viewable portion 361 of the turn 145. The navigation system 110 generates the rotated map 331 by rotating the map in a clockwise direction (as represented by arrow 391) to move the viewable portion 361 of the turn 145 within the display 125. Although the rotated map 331 of FIG. 3B is rotated in the same plane as the original map 130 (FIG. 1), it will be appreciated that the rotated map 331 may include an out-of-plane rotation, changing a pitch or roll of the rotated map 331, as opposed to changing a yaw of the rotated map 331 as shown in FIG. 3B. Any such rotations may increase a viewable portion of the turn 145.

The view presented by the display 125 by the navigation system 110 is automatically changed in response to identifying the intention to turn the vehicle. Thus, without the operator taking a hand off the wheel or eyes off the road to guide the operator's hand, the navigation system 110 presents the operator with the map 230 that provides an increased viewable portion 260 of the turn 145. The operator thus is made aware of how they will have to turn the vehicle. Also, if conditions affect the road ahead around the turn 145, the navigation system 110 may present information about the conditions, as described further below with reference to FIG. 6B.

As previously described, in various embodiments the navigation system 110 may identify an intention of the operator to turn the vehicle by detecting that the vehicle is being turned. In addition, in various embodiments the navigation system 110 may be configured to identify an intention of the operator to turn the vehicle before the vehicle commences a turn. In various embodiments, the navigation system 110 identifies the intention to turn the vehicle by detecting that the vehicle is entering a turn and/or by detecting an operating condition that indicates a potential turn from a current route. The operating condition, as further described below, may include activation of a turn signal, steering into a turning lane, changing velocity of the vehicle upon approaching a potential turn, or other operating conditions.

Figure 4A:
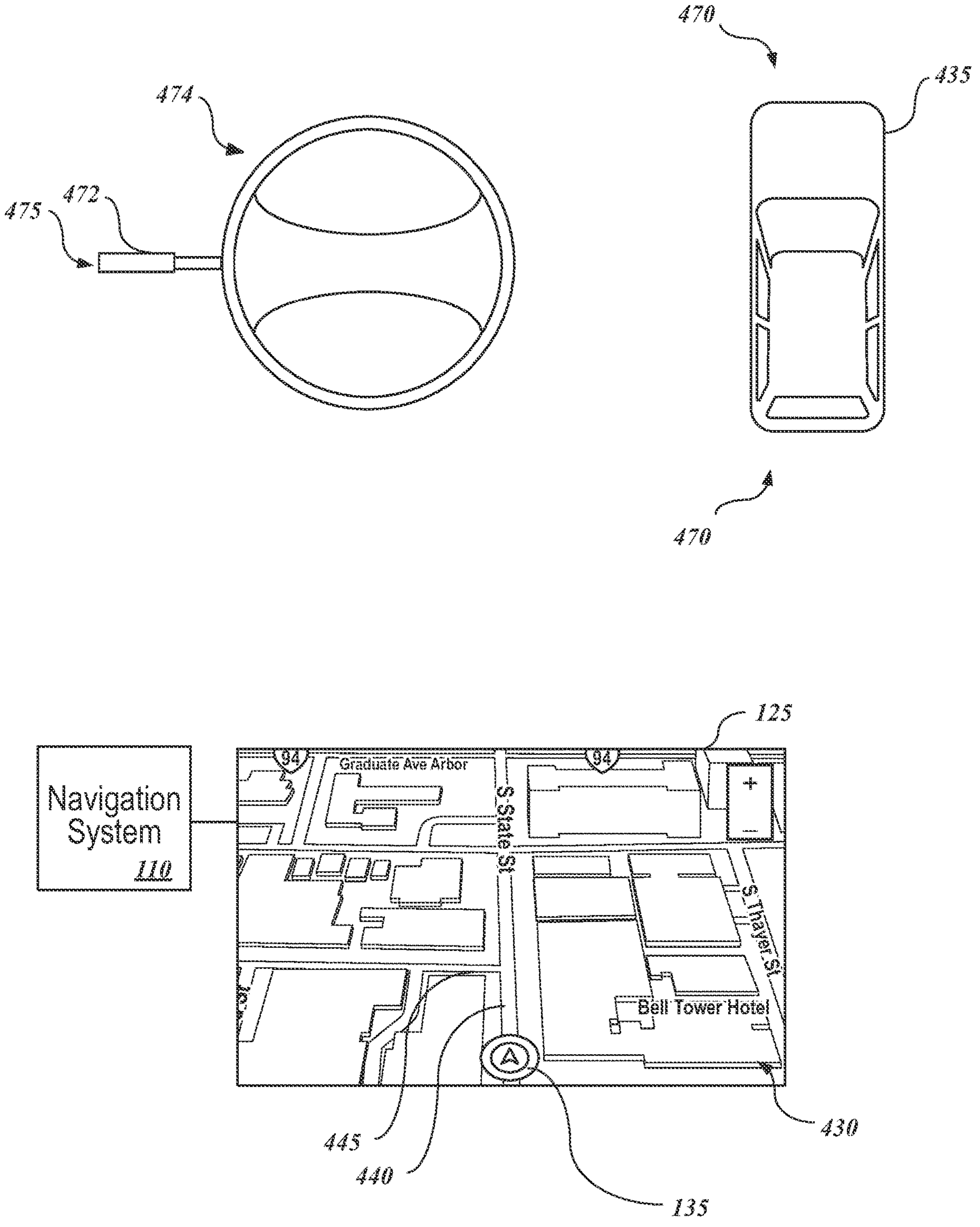
FIGS. 4A-7C are schematic representations of conditions in which an operator of a vehicle may be making a turn and screen displays generated by the navigation system in response to the conditions.

Referring additionally to FIG. 4A, in various embodiments the navigation system 110 presents on the display 125 a map 430 that shows the vehicle 435, as represented by the position indicator 135, traveling forward on a current route 440. The vehicle 435 is approaching a turn 445 that the operator plans to make. As the vehicle 435 moves forward on the current route 440, in various embodiments, the map 430 shows the vehicle 435 proceeding straight on the current route 440 with the map 430 centered left-to-right around the position indicator 135. In various embodiments, the map 430 may also be centered top-to-bottom around the position indicator 135 or the map 430 may be shifted to show the position indicator 135 at a bottom edge of the map 430 to maximize a view of the direction in which the vehicle 435 is traveling. As the vehicle 435 approaches the turn 445, the operator may choose to engage a turn signal 470 by, for example, manipulating a turn signal lever 472 extending from a steering column 474, or by using a tactile input or verbal input usable to activate the turn signal 470.

Figure 4B:
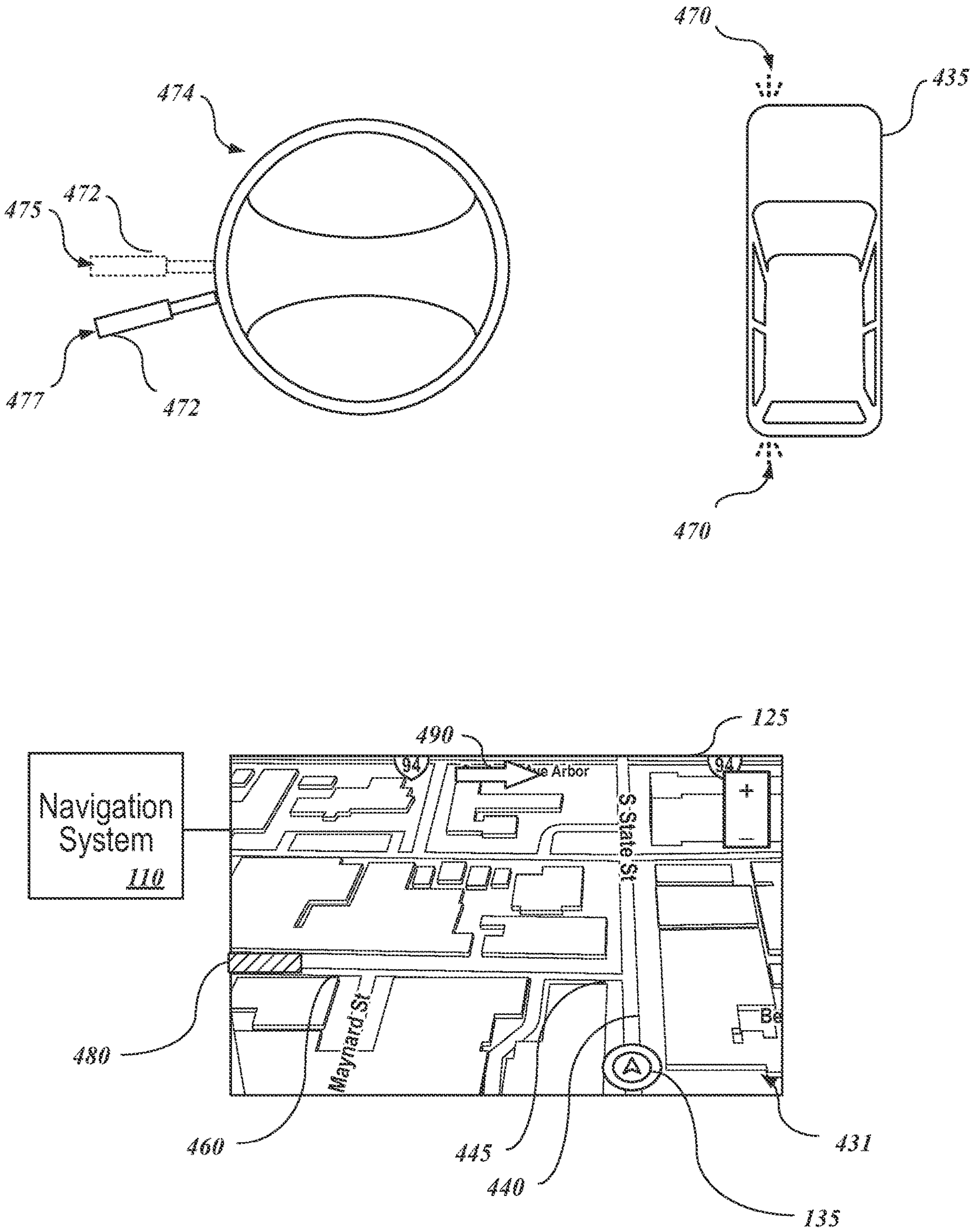

Referring to FIG. 4B, the operator moves the turn signal lever 472 from a rest position 475 into a turn position 477 to activate the turn signal 470 to signal the turn. In various embodiments, the navigational system 110 detects activation of the turn signal 470 via the vehicle interface 105. Upon detecting activation of the turn signal 470, the navigation system 110 recenters the map 430 (FIG. 4A) by recentering or panning the view away from the direction of the turn 445 (as represented by the arrow 490) to present a map 431 to show an increased viewable portion 460 of the turn 145.

In some embodiments, instead of recentering the map as described with reference to FIG. 4B, the scale of the map 430 (FIG. 4A) could be reduced or rotated as described with reference to FIGS. 3A and 3B to show the increased viewable portion 460 of the turn 145. Although the following examples show maps being recentered, panned, or otherwise shifted to illustrate increased viewable portions of turns, it will be appreciated that in some embodiments the increased viewable portions of these turns also may be accomplished by changing the scale of the map or by rotating the map as previously described with reference to FIGS. 3A and 3B.

The increased viewable portion 460 of the turn 445 included on the map 431 thus provides to the operator additional information regarding that which is around the turn 145. The information may include a condition 480, such as traffic, roadwork, and/or other condition that may affect travel. Thus, before the operator makes the turn 445, the operator is apprised of the condition 480 around the turn 445 before the operator reaches any such condition 480—although the condition 480 was not included or viewable in the map 430 (FIG. 4A) before the view was changed in the map 431 to show the increased viewable portion of the turn. Also, the operator may choose to take another route to avoid the condition 180. In addition, if the map 431 with the increased viewable portion 460 of the turn 445 indicates that the turn does not lead to a through street toward a destination, the operator may choose to take another route.

In various embodiments, the navigation system 110 also may be configured to infer the intention of the operator to turn the vehicle 435 based on other vehicles around the vehicle 435 using their turn signals. It will be appreciated that, when a vehicle is proceeding toward a turn in a line of other cars, not all of the operators may use their turn signals. Thus, if an operator of the vehicle 435 does not activate the turn signal 470, the navigation system 110 may nonetheless adjust the view of the map.

Figure 4C:
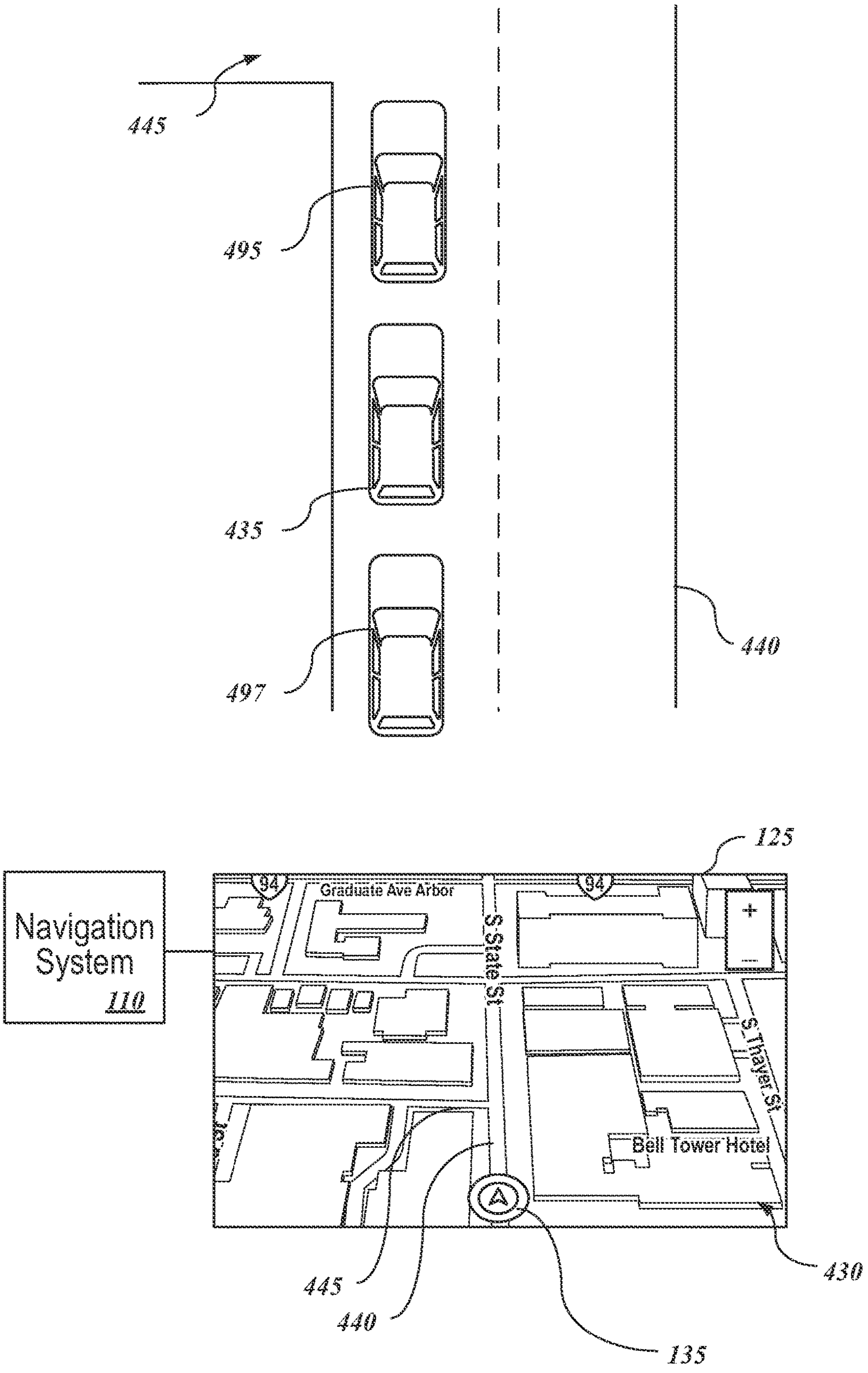
Figure 4D:
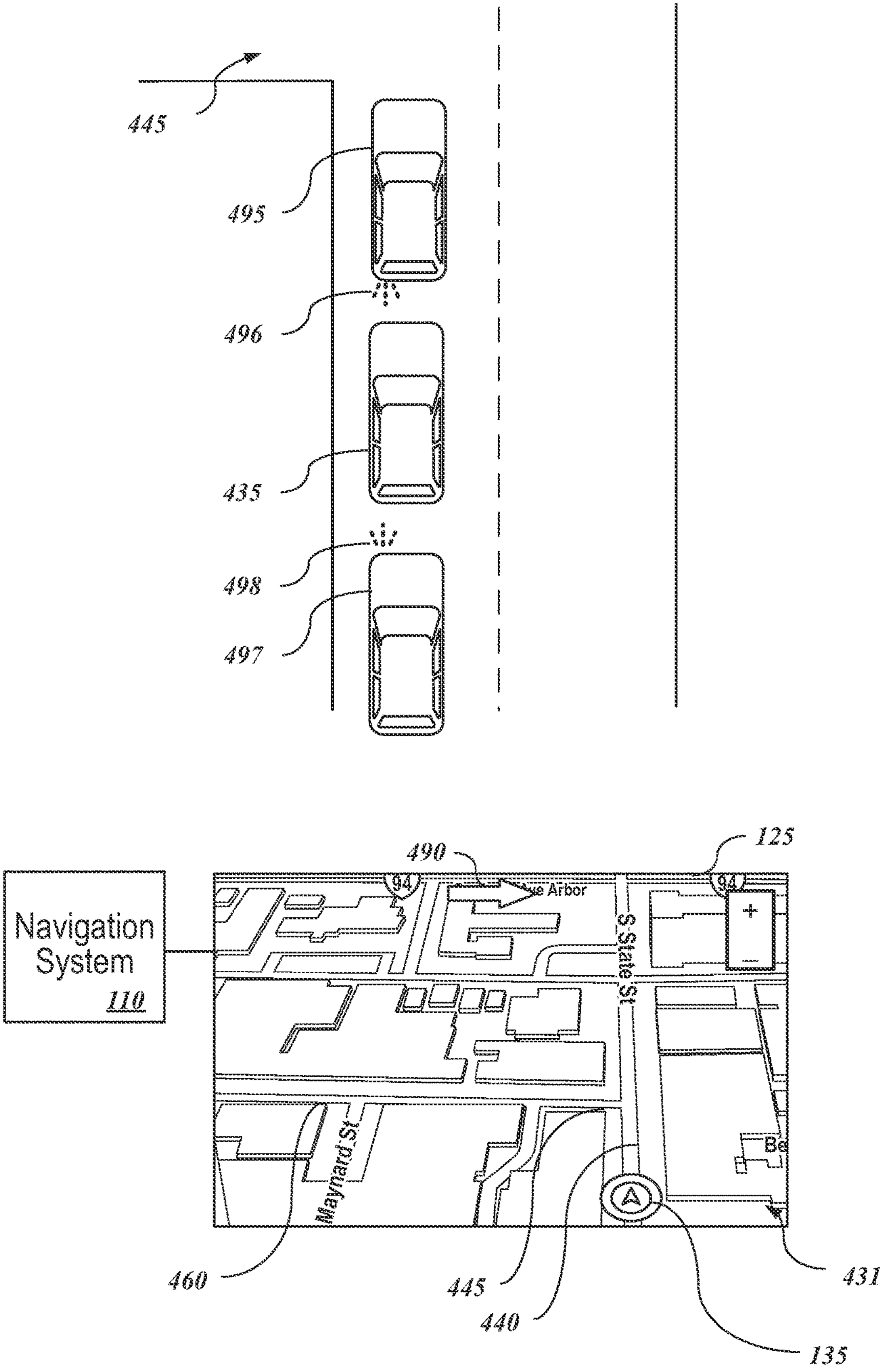

Referring to FIG. 4C, the vehicle 435 travels behind a leading vehicle 495 and/or travels ahead of a trailing vehicle 497. The navigation system displays the same map 430, with the map 430 centered left-to-right around the position indicator 135. Referring to FIG. 4D, if the leading vehicle 495 activates its turn signal 496 and/or the trailing vehicle 497 activates its turn signal 498, the navigation system 110 may detect the turn signal 496 and/or 498 using cameras or other vehicle sensors (not shown) accessible via the vehicle interface 105 (FIG. 1). As a result, the navigation system 110 may infer the intention of the operator to turn the vehicle 435 and recenter the map 430 (FIG. 4A) by recentering or panning the view away from the direction of the turn 445 (as represented by the arrow 490) to present the map 431 to show an increased viewable portion 460 of the turn 145.

It will be appreciated that the operator may not have had an intention to turn the vehicle 435 even if both the leading vehicle 496 and the trailing vehicle 498 do take the turn 445. Thus, even if the map 431 is recentered to include the increased viewable portion 460 of the turn 445, because the map 631 nonetheless encompasses the position indicator 135 on the current route 440 being traveled, an incorrect identification of the operator's intention to turn the vehicle 435 should not present a problem. After the other vehicles 495 and 497 turn away, the navigation system 110 may change a view presented by the display 125 to again show the map 430 as centered left-to-right around the position indicator 135, as previously described.

In various embodiments, the navigation system 110 may identify an intention of the operator to turn the vehicle 435 from an operating condition independent of turn signal usage. Such operating conditions may include a position of the vehicle 435 relative to the turn 445, the velocity of the vehicle 435, and other conditions.

Figure 5A:
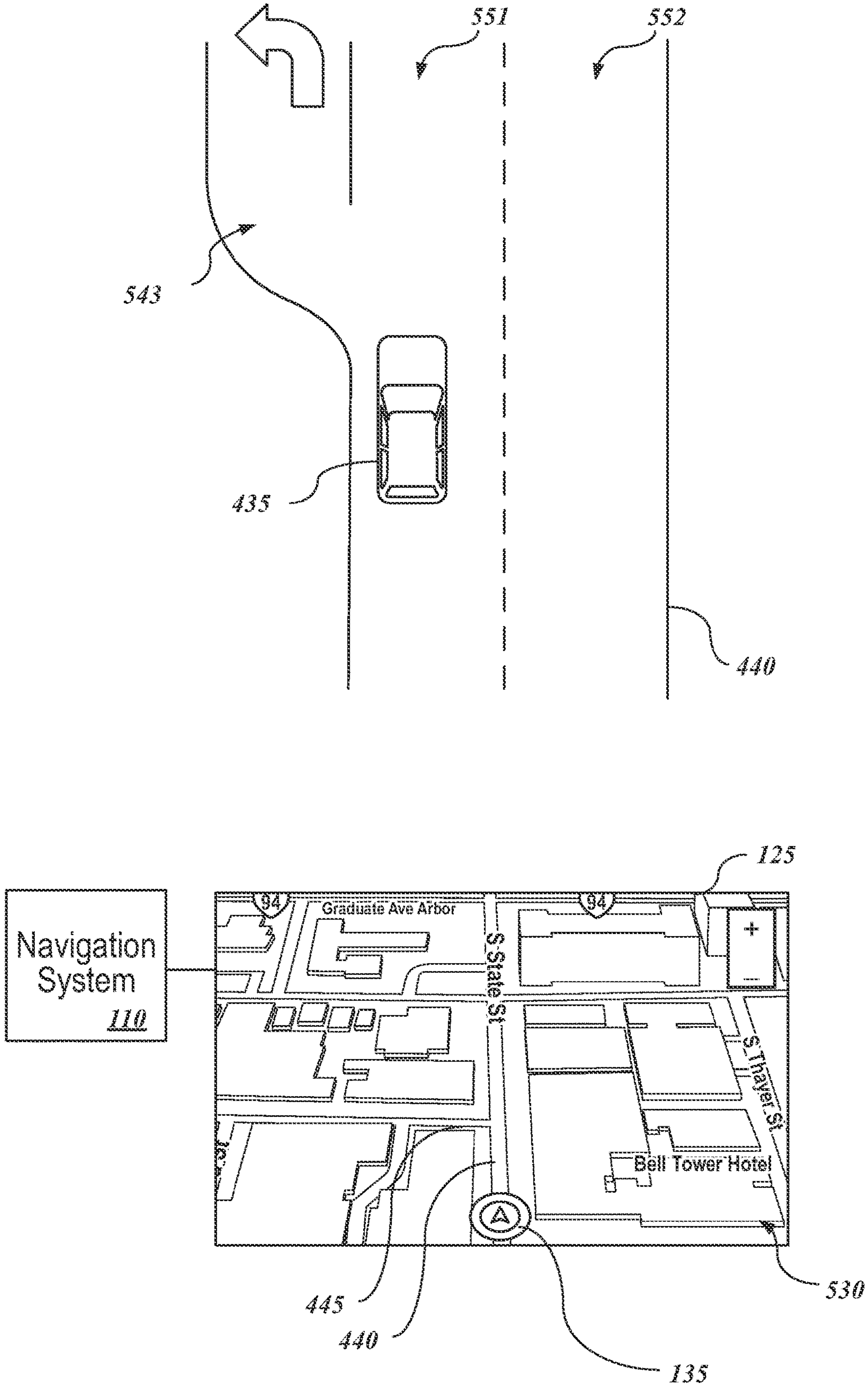

An intention to turn the vehicle 435 may be inferred, at least in part, from the vehicle 435 being present in a particular lane of the current route 440. Referring to FIG. 5A, the position indicator 135 on the map shows the vehicle 435 traveling in a left lane 551 of the current route 440 that is adjacent the turn 445. As the vehicle 435 moves forward on the current route 440, in various embodiments the map 530 shows the vehicle 435 proceeding straight on the current route 440 with the map 530 centered left-to-right around the position indicator 135, as previously described.

Figure 5B:
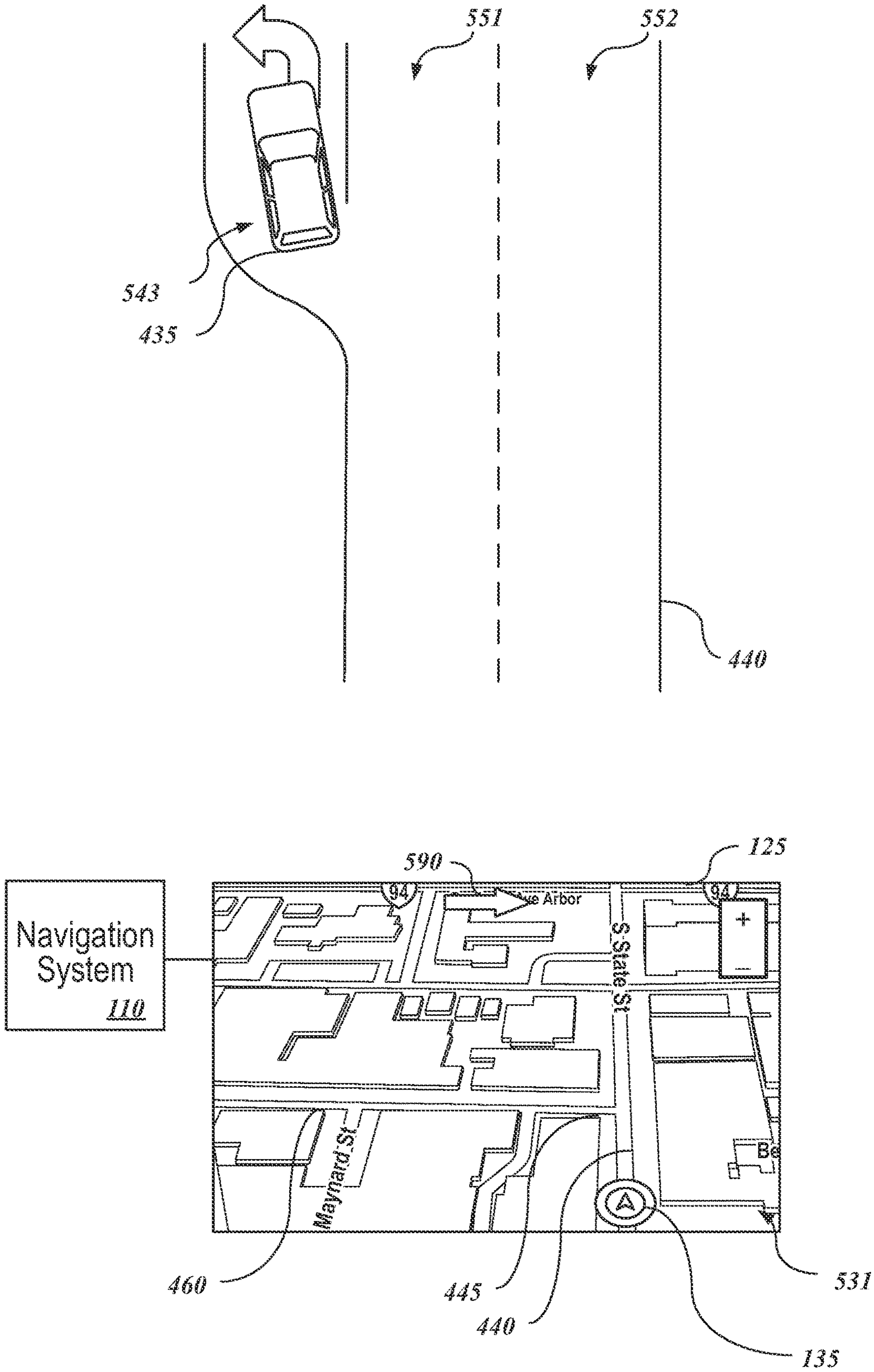

Referring to FIG. 5B, the operator steers the vehicle 435 into a turning lane 543 of the current route 440 to make the turn 445. In various embodiments, the movement of the vehicle 435 into the turning lane 543 is detected by positioning circuitry, optical sensors, or other vehicle sensors available to the navigation system 110 via the vehicle interface 105 (FIG. 1). Upon detecting the move into the turning lane 543, the navigation system 110 identifies the intention of the operator to turn the vehicle 435. As a result, the navigation system 110 recenters the map 530 (FIG. 5A) by recentering or panning the view away from the direction of the turn 445 (as represented by the arrow 590) to present a map 531 to show an increased viewable portion 460 of the turn 445.

Figure 6A:
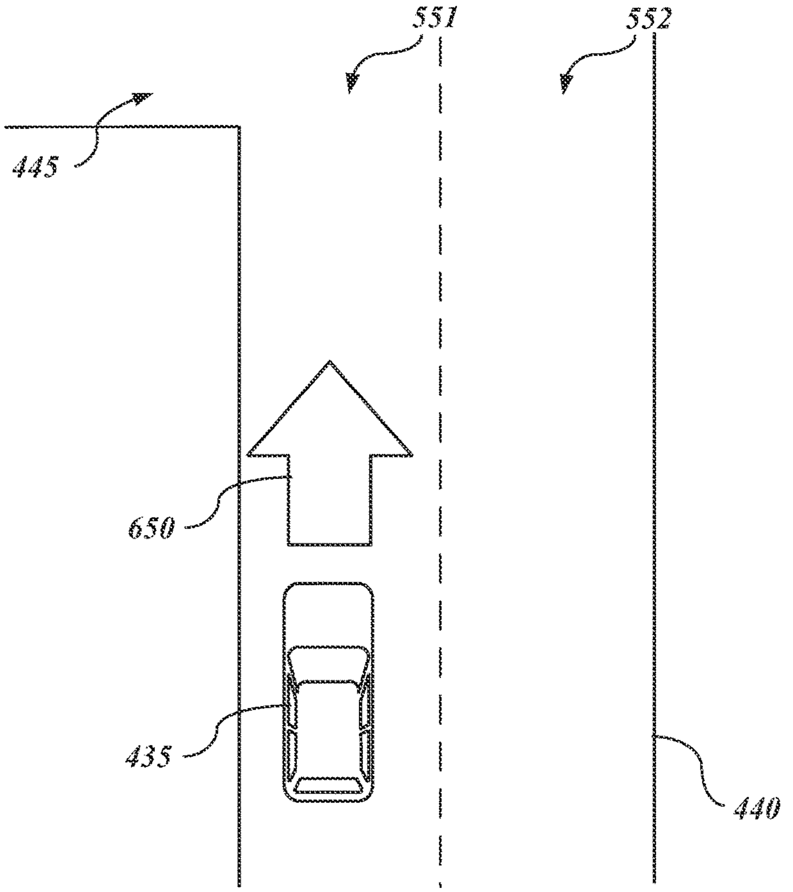
Figure 6A:
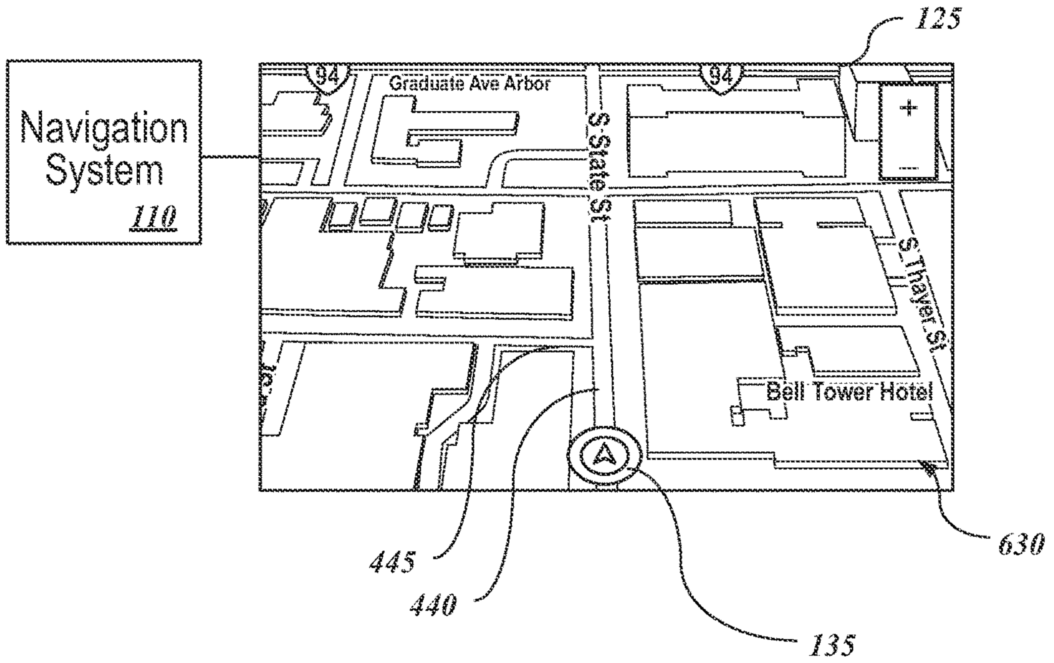

Referring to FIG. 6A, the intention of the operator to turn the vehicle may be determined by position of and/or velocity or changes in velocity of the vehicle 435. The position indicator 135 on the map shows the vehicle 435 traveling in the left lane 551 of the current route 440 that is adjacent the turn 445. The vehicle is traveling at a velocity 650. As the vehicle 435 moves forward on the current route 440, in various embodiments the map 630 shows the vehicle 435 proceeding straight on the current route 440 with the map 630 centered left-to-right around the position indicator 135, as previously described.

Figure 6B:
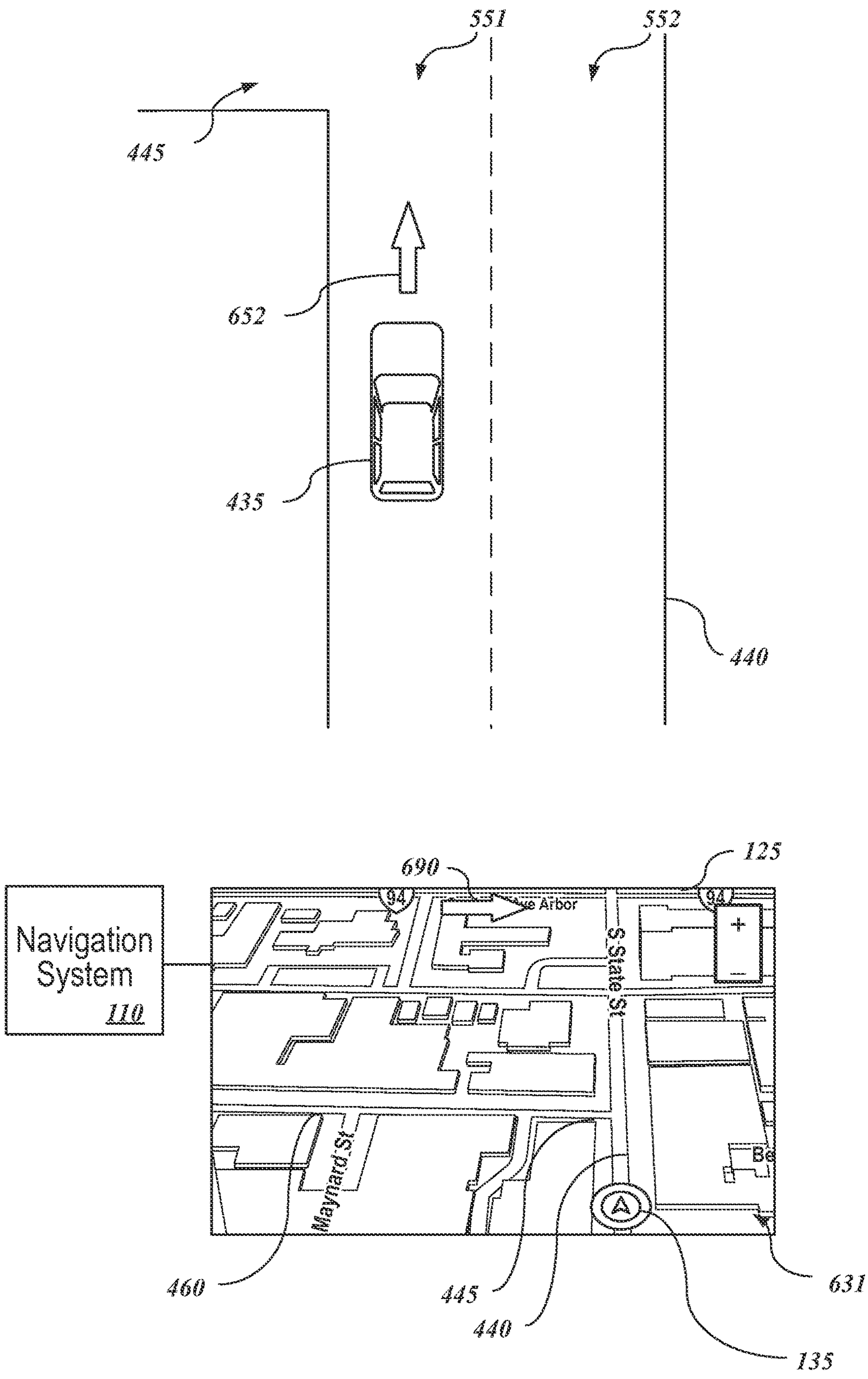

Referring to FIG. 6B, the operator vehicle 435 slows the vehicle 435 from the velocity 650 to a lower velocity 652 as the vehicle 435 approaches the turn 445. In various embodiments, the velocities 650 and 652 are detectable by accelerometers or other sensors incorporated in the navigation system 110 or signals received via the vehicle interface 105 (FIG. 1). Because the vehicle 435 is in the lane 551 adjacent to the turn 445 and the vehicle 435 has slowed from the velocity 650 to the lower velocity 652, the navigation system 110 identifies the intention of the operator to turn the vehicle 435. As a result, the navigation system 110 recenters the map 630 (FIG. 6A) by recentering or panning the view away from the direction of the turn 445 (as represented by the arrow 690) to present a map 631 to show an increased viewable portion 460 of the turn 445.

In various embodiments, in determining that the change in velocity from the velocity 650 to the lower velocity 652 indicates an intention of the operator to turn the vehicle 435, the navigation system 110 may compare the change in velocity to a predetermined threshold and only identify the intention of the operator to turn the vehicle if the change in velocity exceeds the threshold. Similarly, the navigation system 110 may infer the intention of the operator to turn the vehicle 435 if the lower velocity 652 falls below a speed limit of the current route 440 or falls below the speed limit by a predetermined amount. The speed limit of the current route 440 may be included in the map data 112 of the navigation system 110 or otherwise be made accessible to the navigation system 110 from a remote system, as described below with reference to FIG. 13.

Figure 6C:
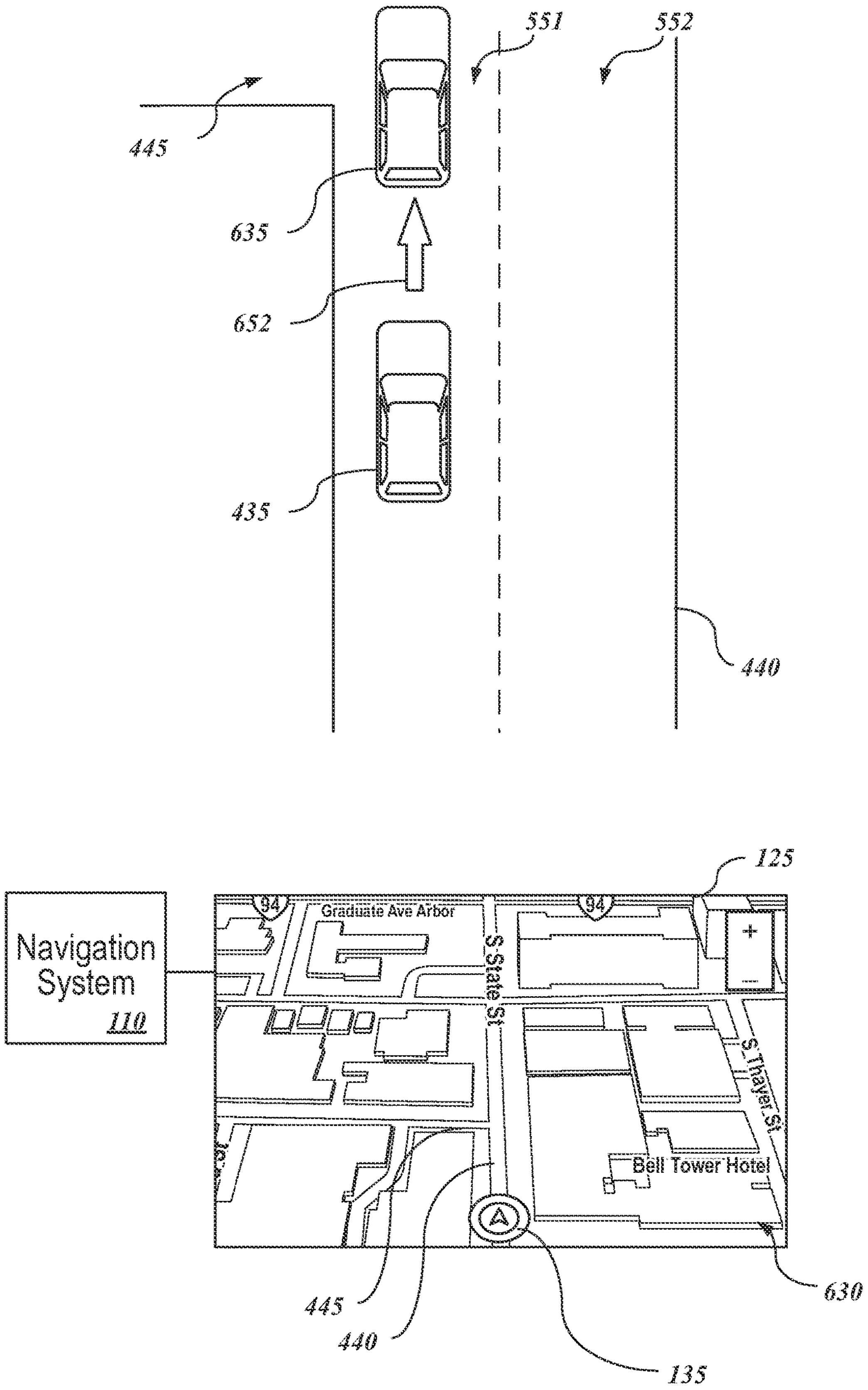

It will be appreciated that the operator may not have had an intention to turn the vehicle but was slowing down for some other reason. Referring additionally to FIG. 6C, as in the example of FIG. 6B, the vehicle 435 is slowed to the lower velocity 652. However, the vehicle 435 may have been slowed to the lower velocity 652 to avoid a second vehicle 635 in the current route 440, possibly as the result of traffic. Thus, in various embodiments, if the vehicle 435 changes to the lower velocity 652 and the second vehicle 635 is detected in the current route 440 within a proximity of the vehicle 435, the navigation system 110 may not identify the change in velocity as indicative of an intention of the operator to turn the vehicle 435. As a result, despite the change in velocity as the vehicle 435 approaches the turn 445, the navigation system 110 continues to present the map 630 as centered left-to-right around the position indicator 135 without changing the map 630 to show the increased viewable portion 460 of the turn 445.

Figure 7A:
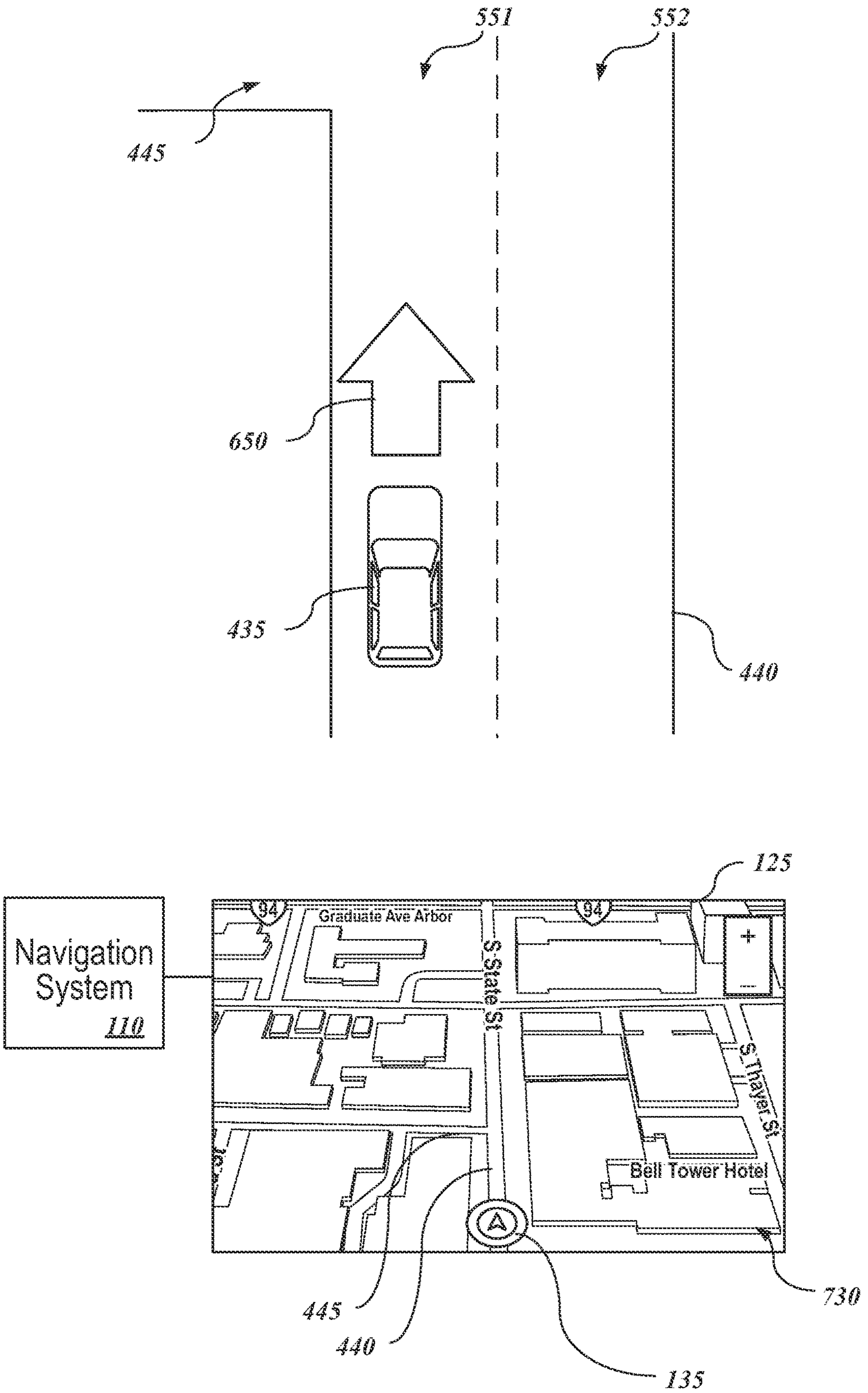

In various embodiments, before inferring an intention of the operator to turn the vehicle 435 from a change in velocity as described with reference to FIGS. 6A-6C or based on other data, the navigation system 110 may evaluate other conditions before changing a map to show the increased viewable portion 460 of the turn 445. Referring additionally to FIG. 7A, as in the example of FIG. 6A, the vehicle is traveling at a velocity 650. As the vehicle 435 moves forward on the current route 440, in various embodiments the map 630 shows the vehicle 435 proceeding straight on the current route 440 with the map 630 centered left-to-right around the position indicator 135, as previously described.

Figure 7B:
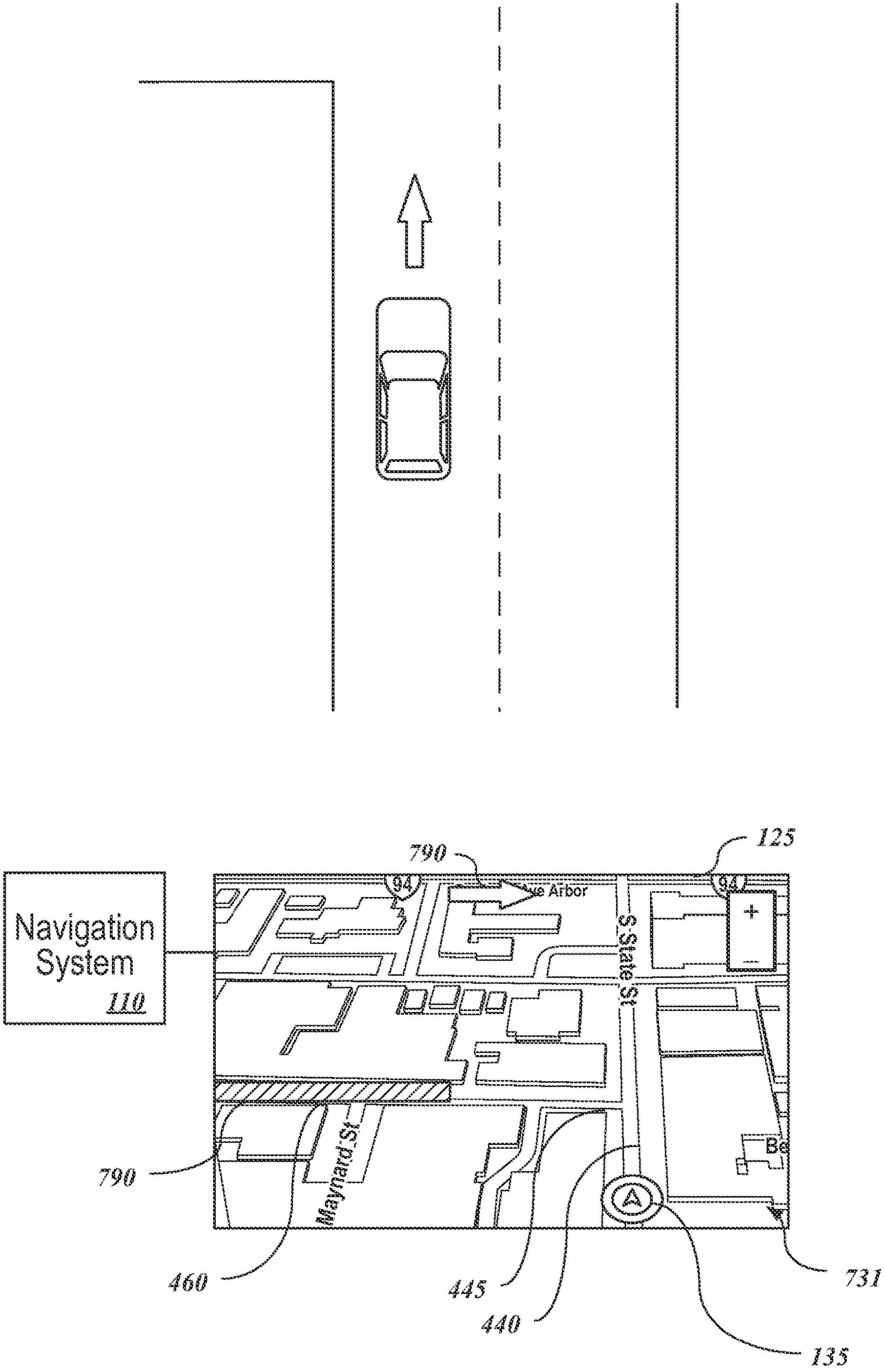

Referring additionally to FIG. 7B, as in the example of FIG. 6B, the operator vehicle 435 slows the vehicle 435 from the velocity 650 to a lower velocity 652 as the vehicle 435 approaches the turn 445. However, in various embodiments, before inferring the intention of the operator to turn the vehicle 435, the navigation system 110 evaluates conditions to detect an adverse condition 790 along the turn 445, such as a road obstruction, a road closure, traffic congestion, or a similar condition along the turn 445.

Figure 7C:
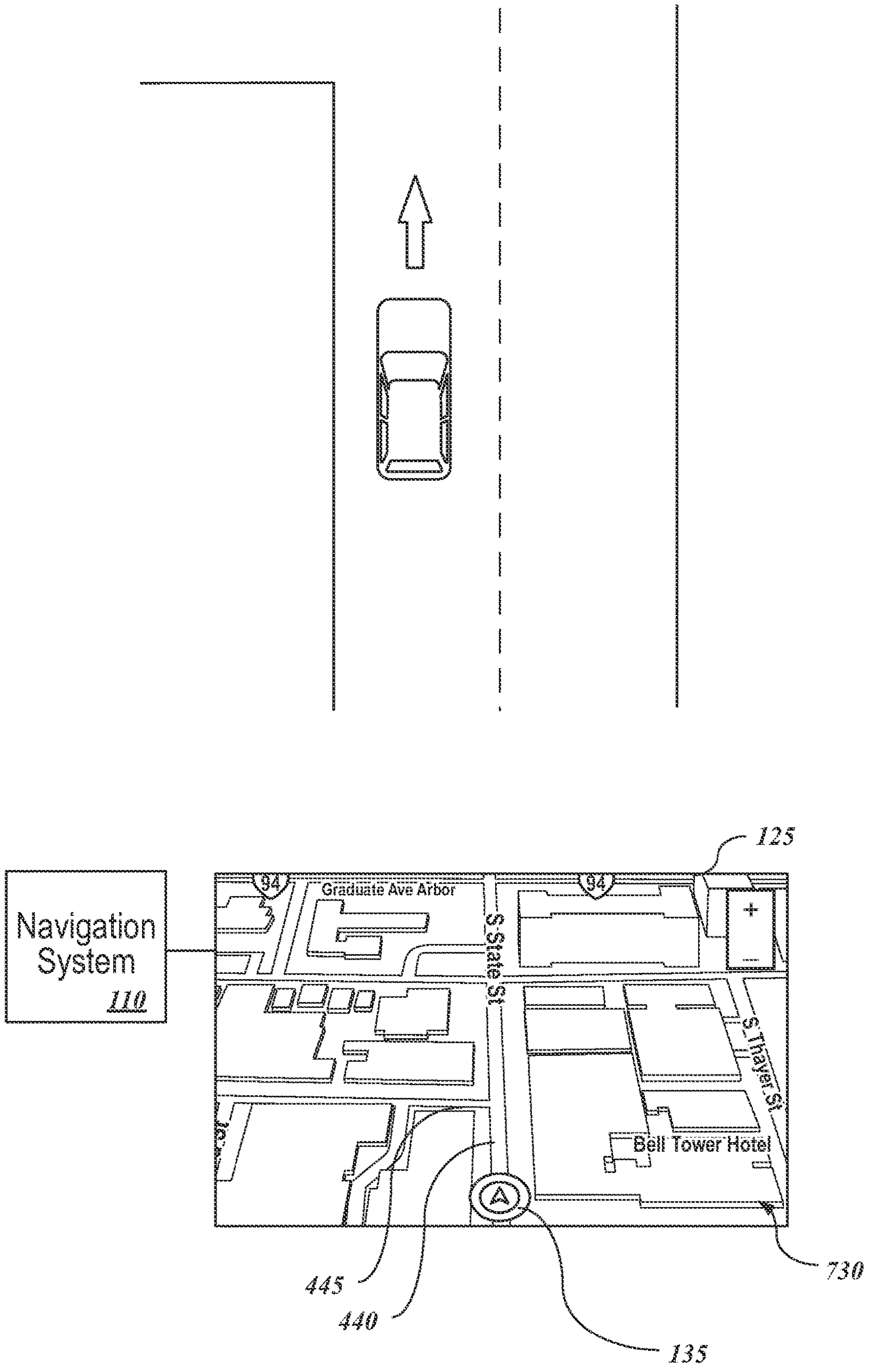

Referring to FIG. 7B, because the navigation system 110 detects the adverse condition 790, the navigation system 110 recenters the map 730 (FIG. 7A) by recentering or panning the view away from the direction of the turn 445 (as represented by the arrow 790) to present a map 731 to show the increased viewable portion 460 of the turn 145. The map 731 includes the adverse condition 790 so that the operator can see that, if the operator did have an intention to turn the vehicle 435 onto the turn 445, the operator may wish to choose another route. Referring to FIG. 7C, if the navigation system 110 does not detect the adverse condition 790 (despite the change in velocity), then the navigation system 110 continues to present the map 730 as centered left-to-right around the position indicator 135 without changing the map 730 to show the increased viewable portion 460 of the turn 445. Thus, whether the navigation system 110 infers an intention of the operator to turn the vehicle 435 may depend on an adverse condition or another condition existing in addition to detecting an operating condition that may indicate an intention of the operator to turn the vehicle 435.

In various embodiments. the navigation system 110 may be integrated into or carried aboard any suitable vehicle or supported by a standalone computing device. A vehicle may include a car, truck, sport utility vehicle, van, or recreational vehicle. In various embodiments, the vehicle also may include a motorcycle, all-terrain vehicle, or an electrically-powered moped or bicycle.

Figure 8:
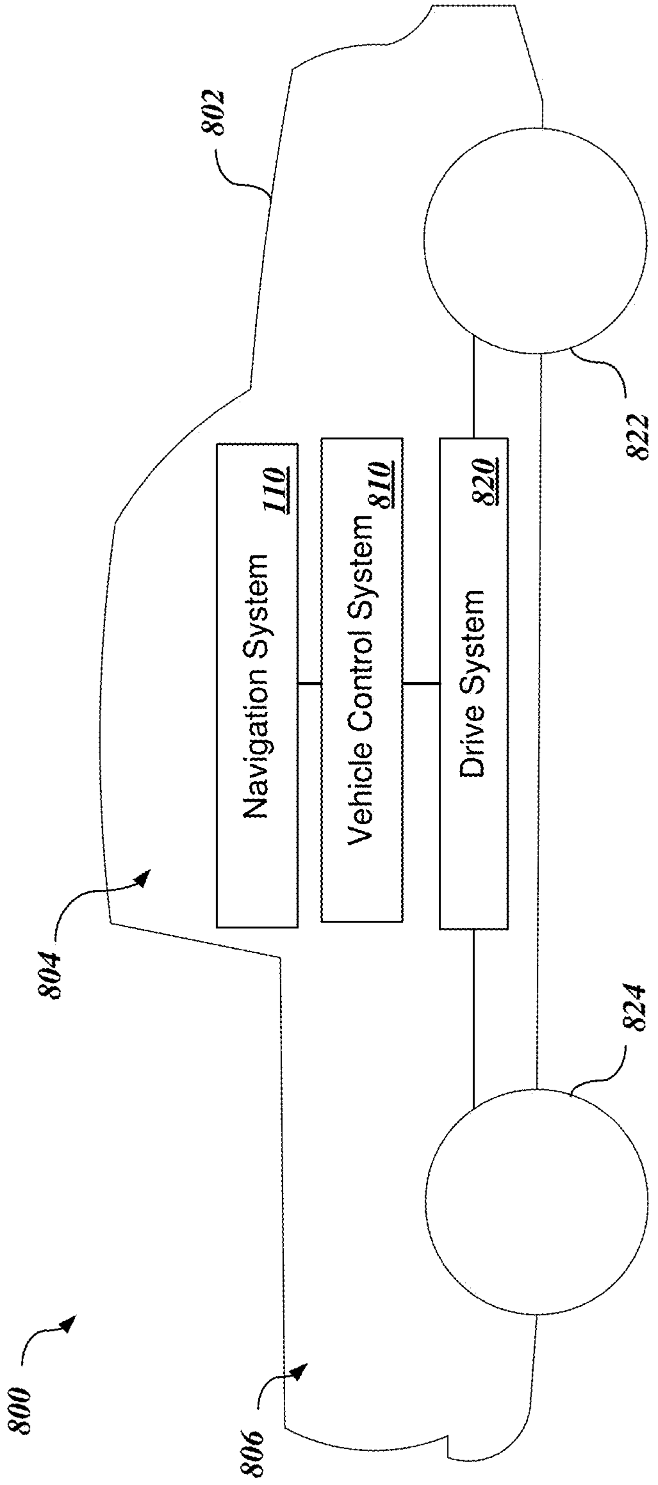
FIGS. 8-10 are block diagrams in partial schematic form of vehicles with the navigation system of FIG. 1.

Referring additionally to FIG. 8, in various embodiments a vehicle 800 includes an integrated vehicle control system 810 that controls operation of the vehicle 800. In various embodiments, the vehicle control system 810 may incorporate or interoperate with the navigation system 110. In various embodiments, the navigation system 110 may be a standalone system that is transportable aboard the vehicle 800, such as a smartphone, tablet computer, or other portable computing device.

In various embodiments, the vehicle 800 includes a body 802 that may include a cabin 804 capable of accommodating an operator, one or more passengers, and/or cargo, and a cargo area 806 separate from the cabin 804, such as a trunk or a truck bed, capable of transporting cargo. When the cabin 804 accommodates one or more occupants, the navigation system 110 may be installed in and/or accessible from the cabin 804, as further described below with reference to FIG. 11. The vehicle 800 includes a drive system 820, as further described below, which is selectively engageable with one or more front wheels 822 and/or one or more rear wheels 824 to motivate, accelerate, decelerate, stop, and steer the vehicle 800.

Figure 9:
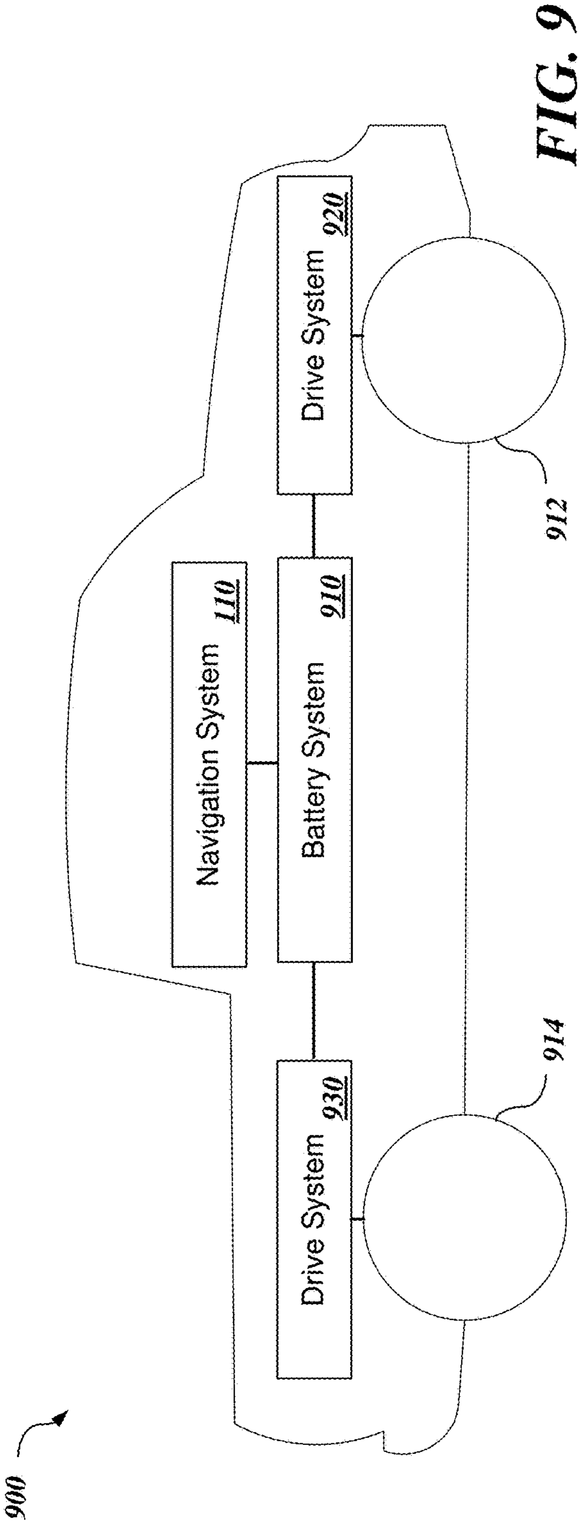

Referring additionally to FIG. 9, the navigation system 110 may be used with an electrically-powered vehicle 900. The wheels 912 and/or 914 may be motivated by one or more electrically-powered drive systems 920 and/or 930, such as motors, that are operably coupled with the wheels 912 and/or 914. The drive systems 920 and 930 draw power from a battery system 910, which also may be used to power the navigation system 110.

Figure 10:
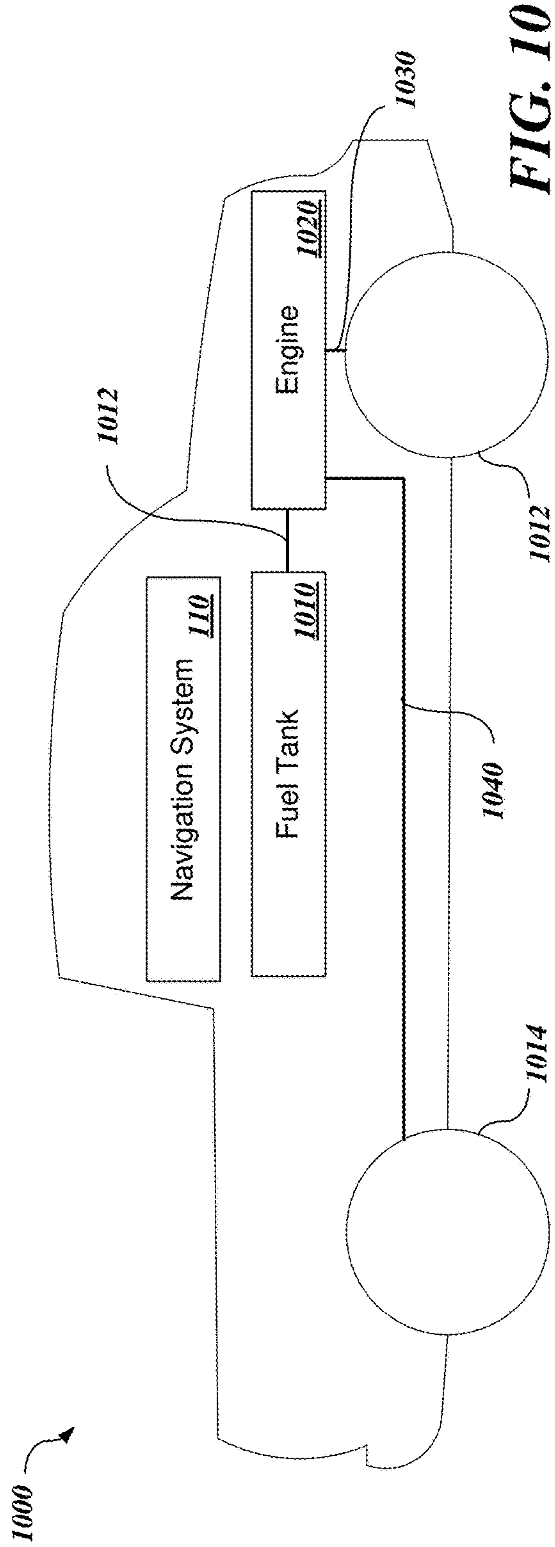

Referring additionally to FIG. 10, the navigation system 110 may be used with an internal combustion engine-powered vehicle 1000. The wheels 1012 and/or 1014 may be motivated by an internal combustion or hybrid engine 1020 coupled with a fuel tank 1010 via a fuel line 1012. The engine 1020 may be coupled to the wheels 1012 and/or 1014 by mechanical linkages 1030 and 1040, respectively, including axles, transaxles, or other drive train systems to provide rotational force to power the wheels 1012 and/or 1014. It will be appreciated that FIGS. 8-10 show four-wheeled land vehicles. However, as previously mentioned, it will be appreciated that the navigation system 110 may be integrated with other land vehicles.

Figure 11:
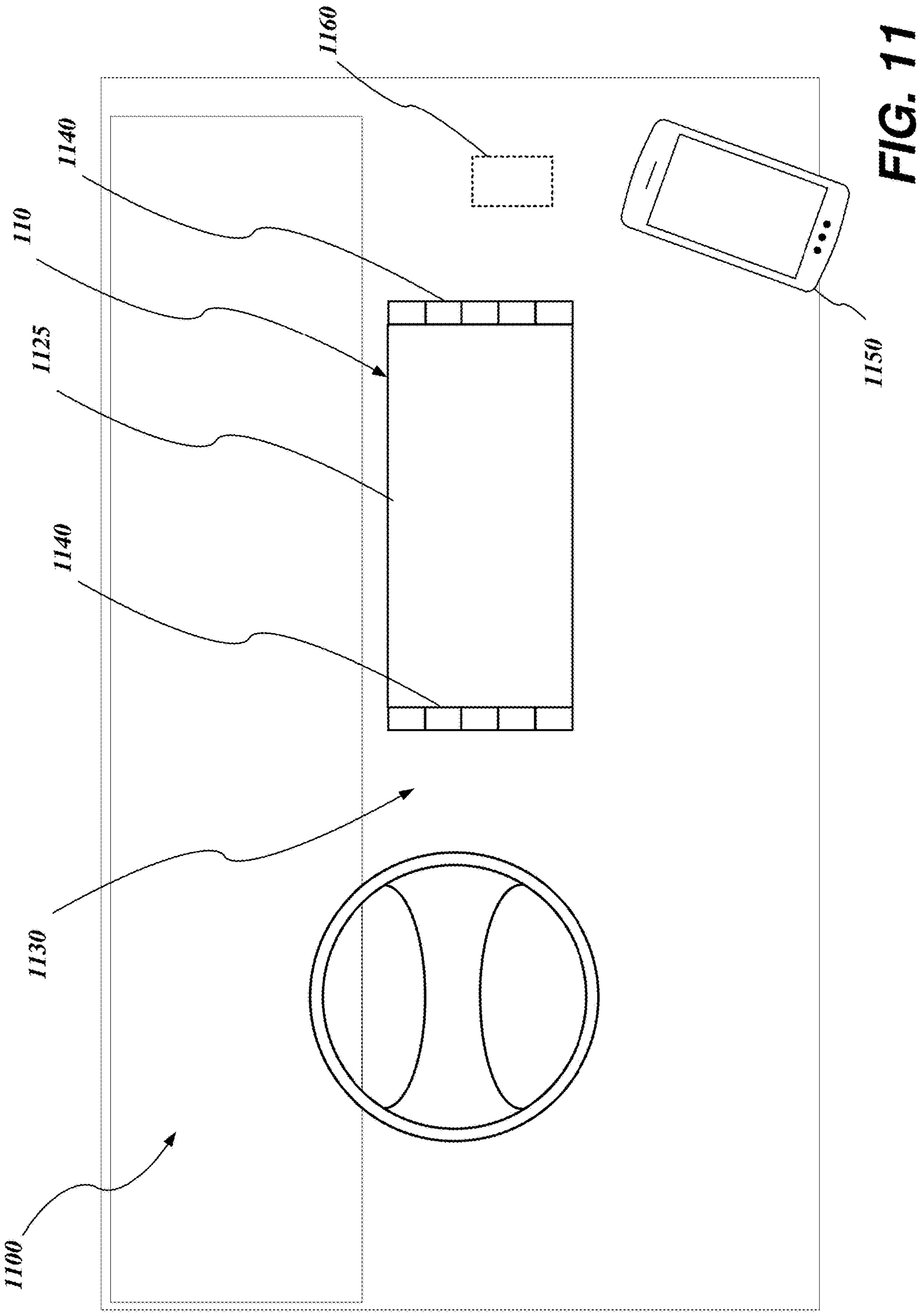
FIG. 11 is a perspective view of a cabin of a vehicle equipped with or with access to the navigation system of FIG. 1.
Figure 13:
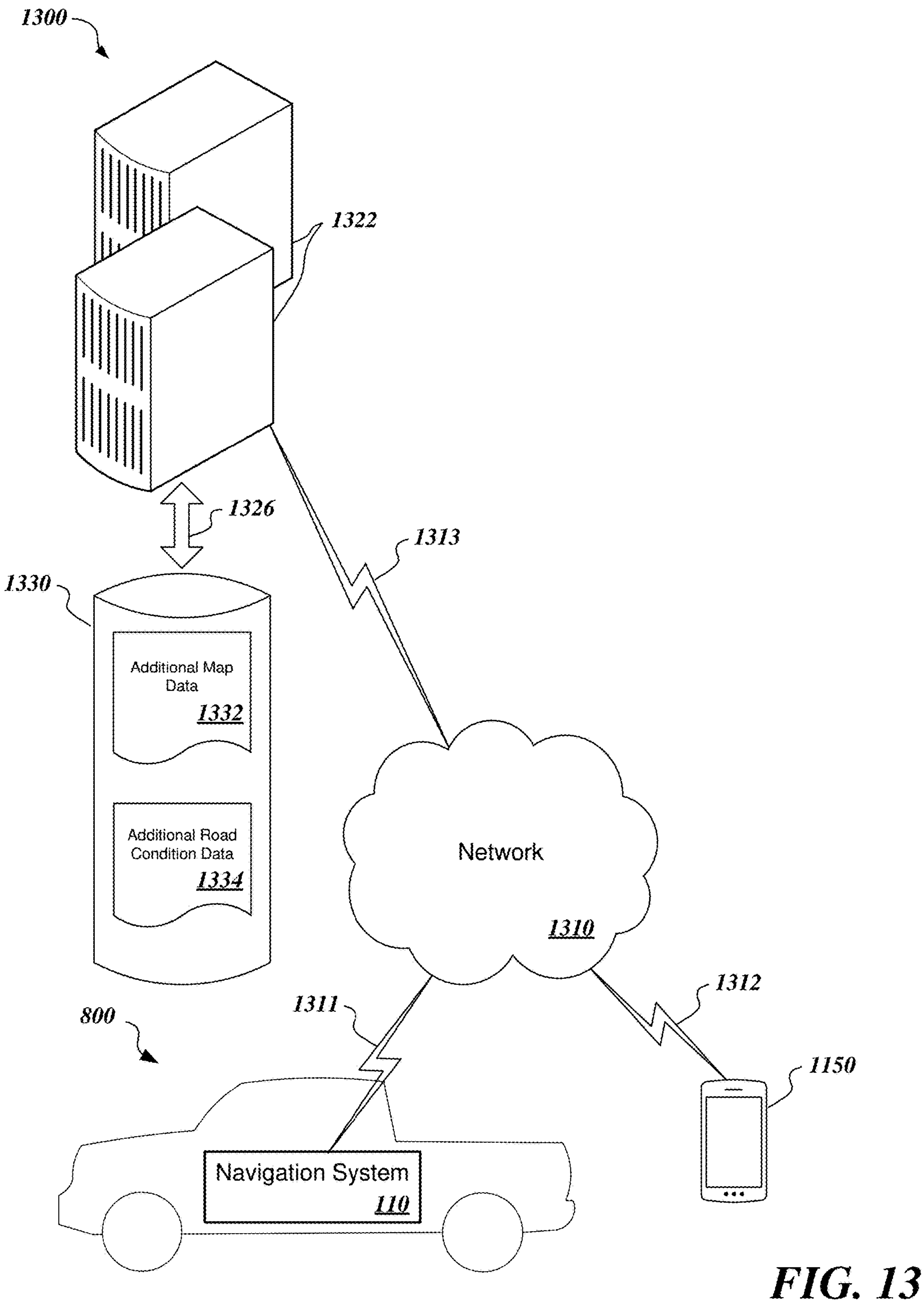
FIG. 13 is a block diagram of one or more illustrative systems of FIG. 1 communicating with one or more remote systems.

Referring additionally to FIG. 11, in various embodiments a cabin 1100 (if provided) of a vehicle, such as the cabin 804 of the vehicle 800 (FIG. 8), may include an integrated navigation system 110. As previously described, the navigation system 110 may be integrated with or interoperable with the vehicle control system 1310 (FIG. 13). The integrated navigation system 110 may use a display 1125 incorporated in a dashboard or console 1130 within the cabin 1100. The display 1125 may include an interactive display, as previously described with reference to FIG. 1 or a user may engage the navigation system 110 with other input devices 1140 arrayed on the dashboard 1130 or with verbal commands using the audio input interface 122 (FIG. 1). The navigation system 110 may be directly coupled with onboard vehicle systems and sensors to gather data as previously described. The functions of the navigation system 110 also may be supported on a standalone computing device 1150, such as a smartphone, tablet computer, portable computer, smartwatch, or dedicated device. The navigation system 110 may interface with other vehicle systems via the vehicle interface 105 (FIG. 1) 810 via a wired or wireless interface 1160 to enable the standalone computing device 1150 to exchange data with the vehicle systems.

Figure 12:
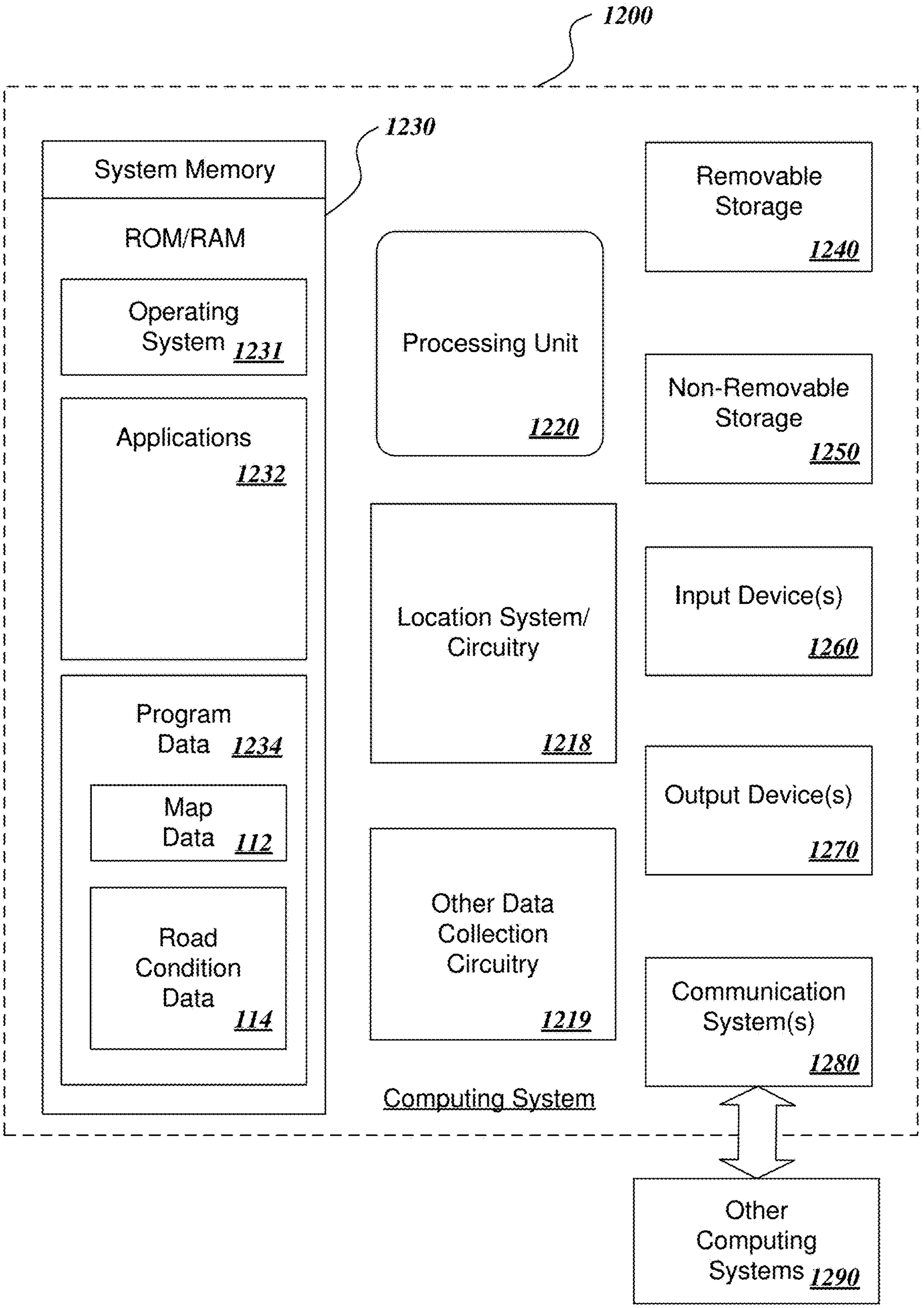
FIG. 12 is a block diagram of an illustrative computing system for performing functions of the navigation system of FIG. 1.

Referring additionally to FIG. 12 and given by way of example only and not of limitation, the navigation system 110 may include a general purpose computing device 1200 configured to operate according to computer-executable instructions for adjusting the viewable portion of a turn as previously described. The computing device 1200 typically includes at least one processing unit 1220 and a system memory 1230. Depending on the configuration and type of computing device, the system memory 1230 may include volatile memory, such as random-access memory ("RAM"), non-volatile memory, such as read-only memory ("ROM"), flash memory, and the like, or a combination of volatile memory and non-volatile memory. The system memory 1230 typically maintains an operating system 1231, one or more applications 1232, and program data 1234. The operating system 1231 may include any number of operating systems executable on desktop or portable devices including, but not limited to, Linux, Microsoft Windows®, Apple iOS®, or Android®, or a proprietary operating system. The applications 1232 may include instructions for navigation control configured to automatically change a view presented by the navigation system to increase a viewable portion of a turn. The program data 1234 may include the map data 112 and road condition data 114.

The computing device 1200 may also have additional features or functionality. For example, the computing device 1200 may also include additional data storage devices (removable and/or non-removable) such as, for example, magnetic disks, optical disks, tape, or flash memory. Such additional storage devices are illustrated in FIG. 12 by removable storage 1240 and non-removable storage 1250. Computer storage media may include volatile and non-volatile, removable and non-removable media implemented in any method or technology for storage of information, such as computer-readable instructions, data structures, program modules or other data. The system memory 1230, the removable storage 1240, and the non-removable storage 1250 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 1200. Any such computer storage media may be part of the computing device 1200.

The computing device 1200 may also have input device(s) 1260 such as a keyboard, stylus, voice input device, touchscreen input device, etc. Output device(s) 1270 such as a display, speakers, short-range transceivers such as a Bluetooth transceiver, etc., may also be included. The computing device 1200 also may include one or more communication systems 1280 that allow the computing device 1200 to communicate with other computing systems 1290, such as those described below with reference to FIG. 13. As previously mentioned, the communication system 1280 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

In further reference to FIG. 12, the computing device 1200 may include the location system/circuitry 1218, which may include global positioning system ("GPS") and/or geolocation circuitry that can automatically discern its location based on relative positions to multiple GPS satellites or other signal sources, such as cellphone towers or other signal sources. The location system/circuitry 1218 may be used to determine a location of the navigation system 110, as previously described. The computing device 1200 also may include other data collection circuitry 1219, such as an altimeter, a compass, and similar circuitry to collect data about the locations through which the navigation system 110 travels, as previously described.

In addition to one or more onboard computing systems, various embodiments may communicate with remote computing systems to perform the functions herein described. Referring to FIG. 13, an operating environment 1300 may include one or more sets of remote computing systems 1320. It will be appreciated that the remote computing system 1320 may include one or more computing systems 1322 that may reside at one or more locations. In various embodiments, the remote computing systems 1320 each may include a server or server farm. The remote computing system 1320 may provide additional sources of travel-related data, such as additional map data 1332 and additional road condition data 1334. The data may be used to update or supplement data stored on the navigation system 110 aboard the vehicle 800 or on a standalone computing device 1370 usable to provide the functions of the navigation system 110. The remote computing system 1320 may access programming and data used to perform their functions or the additional map data 1332 and additional road condition data 113 over high-speed buses 1326 to interact with data storage 1330.

The additional map data 1332 and additional road condition data 1334 at the remote computing system 1300 may be accessible to populate, restore, update or augment the map data 112 and the road condition data 114 (FIG. 1) respectively, stored in the navigation system 110 that, in various embodiments, is integrated with or transportable aboard the vehicle 1300.

In various embodiments, the remote computing systems 1320 communicate with a network 1310 over wired and/or wireless communications links 1313. The navigation system 110 may be integrated with or transportable aboard a vehicle, such as the vehicle 1300 (FIG. 13). The navigation system 110 may communicate over the network 1310 via communications links 1311 to access the remote computing system 1320 to retrieve or store data from the data storage 1330. The communications links 1311 may include wireless communications links to enable mobile communications with the navigation system 110 or may include a wired links to be used, for example, when the vehicle 1300 includes an electric vehicle that is stopped and/or plugged in for charging.

The functions of the navigation system 110 also may be supported by a computing system 1150 that is not integrated with the vehicle 800. The computing system 1150 may communicate over the network 1310 via a communications link 1312 to access the remote computing system 1320 to retrieve data from the additional map data 1332 and additional road condition data 1334 in the data storage 1330. The communications link 1312 may include a wireless or a wired communications link.

Figure 14:
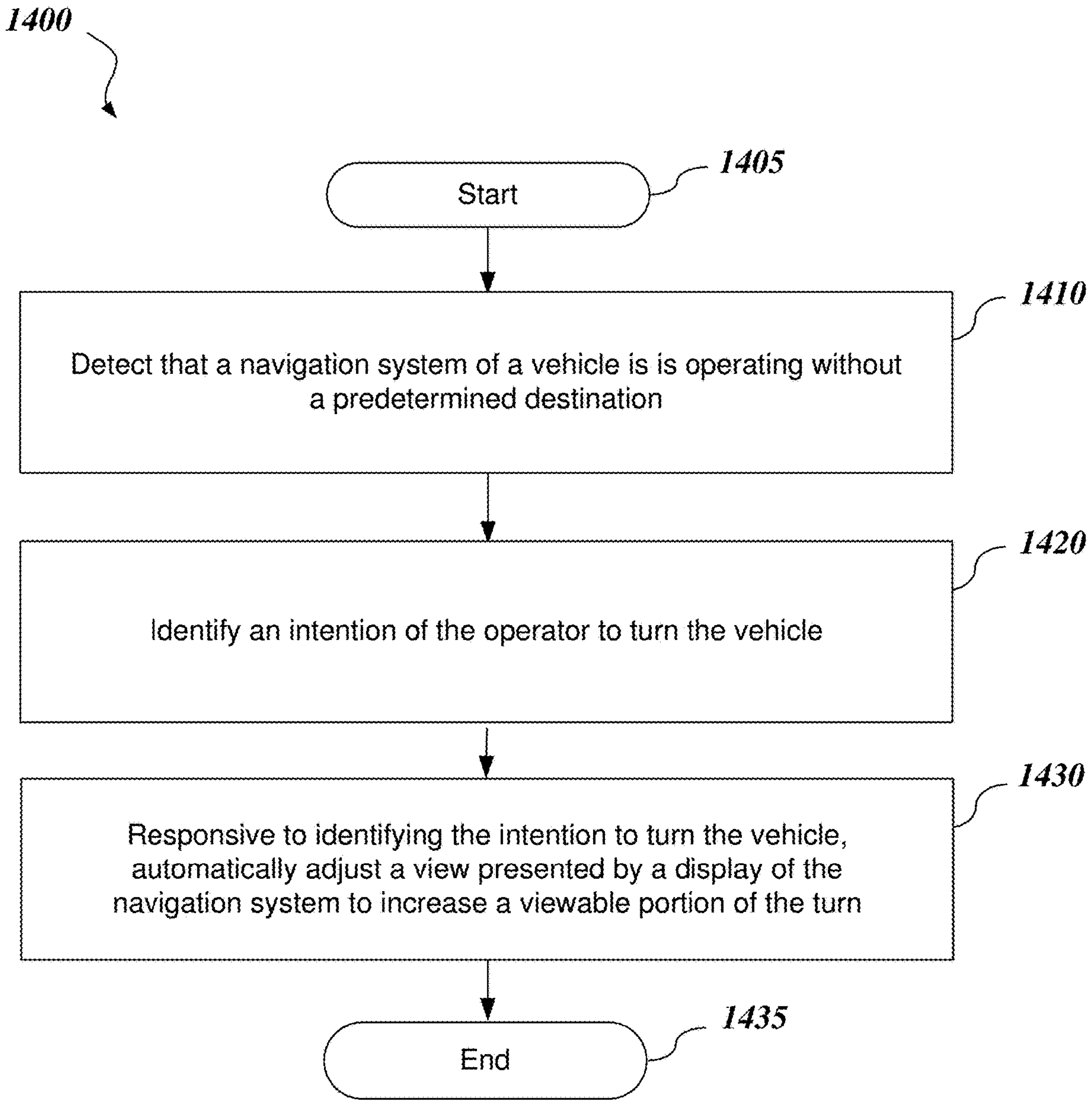
FIG. 14 is a flow chart of an illustrative method for detecting an intention of an operator of a vehicle to turn the vehicle and automatically changing a view presented by the navigation system to increase a viewable portion of the turn.

Referring to FIG. 14, an illustrative method 1900 is provided for detecting an intention of an operator of a vehicle to turn the vehicle and automatically changing a view presented by the navigation system to increase a viewable portion of the turn. The method 1400 starts at a block 1405. At a block 1410, it is detected that a navigation system of a vehicle is operating without a predetermined destination. At a block 1420, an intention of the operator to turn the vehicle is identified. At a block 1430, responsive to identifying the intention to turn the vehicle, a view presented by a display of the navigation system is automatically adjusted to increase a viewable portion of the turn. The method 1400 ends at a block 1435.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:

a computing device including:

a processor; and computer-readable media configured to store computer-executable instructions configured to cause the processor to:

detect that a navigation system of a vehicle is operating without a predetermined destination;

detect a first velocity of the vehicle prior to approaching a potential turn;

detect a second velocity of the vehicle upon approaching the potential turn that is less than the first velocity of the vehicle;

detect operating conditions that indicate a-the potential turn from a current route, the operating conditions including:

a position of the vehicle relative to the potential turn, and a change in velocity of the vehicle that exceeds a velocity change threshold, wherein the change in velocity of the vehicle is a difference between the first velocity of the vehicle and the second velocity of the vehicle;

responsive to detecting the operating conditions of the vehicle, identify an intention of an operator to turn the vehicle; and responsive to identifying the intention of the operator to turn the vehicle, automatically adjust a view presented by a display of the navigation system to increase a viewable portion of the potential turn.

2. The system of claim 1, wherein the operating conditions further include engagement of a turn signal of the vehicle.

3. The system of claim 2, wherein the operating conditions further include an external turn signal generated by another vehicle chosen from a leading vehicle ahead of the vehicle and a trailing vehicle following the vehicle.

4. The system of claim 1, wherein the position of the vehicle relative to the potential turn is partially in a turning lane and partially in a lane for completing the potential turn.

5. The system of claim 1, wherein the change in the velocity of the vehicle reduces a velocity of the vehicle below a predetermined margin below a speed limit of the current route.

6. The system of claim 1, wherein the operating conditions further include traffic conditions on the current route.

7. The system of claim 1, wherein the computer-executable instructions are further configured to cause the processor to:

detect an adverse condition; and adjust the view presented by the display of the navigation system to include the adverse condition.

8. The system of claim 1, wherein:

the computer-executable instructions are further configured to cause the processor to present at least one altered view on the display of the navigation system; and the altered view is chosen from a recentered view to reposition a current vehicle position toward an edge of the view opposite the one or more upcoming turns, a view with an adjusted scale, and a rotated view.

9. A computer-implemented method comprising:

detecting that a navigation system of a vehicle is operating without a predetermined destination;

detecting a first velocity of the vehicle prior to approaching a potential turn;

detecting a second velocity of the vehicle upon approaching the potential turn that is less than the first velocity of the vehicle;

detecting operating conditions that indicate a potential turn from a current route, the operating conditions including:

a position of the vehicle relative to the potential turn, and a change in velocity of the vehicle that exceeds a velocity change threshold, wherein the change in velocity of the vehicle is a difference between the first velocity of the vehicle and the second velocity of the vehicle;

responsive to detecting the operating conditions of the vehicle, identifying an intention of an operator to turn the vehicle; and responsive to identifying the intention of the operator to turn the vehicle, automatically adjusting a view presented by a display of the navigation system to increase a viewable portion of the turn.

10. The computer-implemented method of claim 9, wherein the operating conditions further include engagement of a turn signal of the vehicle.

11. The computer-implemented method of claim 10, further comprising:

detecting an adverse condition; and adjusting the view presented by the display of the navigation system to include the adverse condition.

12. The computer-implemented method of claim 9, wherein the position of the vehicle relative to the potential turn is partially in a turning lane and at least partially in a lane for completing the potential turn.

13. The computer-implemented method of claim 9, wherein the change in the velocity of the vehicle reduces a velocity of the vehicle below a predetermined margin below a speed limit of the current route.

14. The computer-implemented method of claim 9, wherein the operating conditions further include traffic conditions on the current route.

15. The computer-implemented method of claim 9, further comprising:

presenting at least one altered view on the display of the navigation system, wherein the altered view is chosen from a first view that is recentered to reposition a current vehicle position toward an edge of the view opposite the potential turn, a second view with an adjusted scale, and a third view that is rotated.

* * * * *